US009930117B2

(12) United States Patent
Reed et al.

(10) Patent No.: US 9,930,117 B2
(45) Date of Patent: Mar. 27, 2018

(54) MATRIX VECTOR MULTIPLY TECHNIQUES

(71) Applicant: INTERACTIC HOLDINGS, LLC, Austin, TX (US)

(72) Inventors: Coke S. Reed, Austin, TX (US); Ronald R. Denny, Brooklyn Park, MN (US); Jay W. Rockstroh, Ellicott City, MD (US); Michael R. Ives, Hortonville, WI (US)

(73) Assignee: Interactic Holdings, LLC, Austin, TX (US)

( * ) Notice: Subject to any disclaimer, the term of this patent is extended or adjusted under 35 U.S.C. 154(b) by 240 days.

(21) Appl. No.: 14/871,431

(22) Filed: Sep. 30, 2015

(65) Prior Publication Data

US 2016/0094660 A1 Mar. 31, 2016

Related U.S. Application Data

(60) Provisional application No. 62/057,793, filed on Sep. 30, 2014, provisional application No. 62/076,827, filed on Nov. 7, 2014.

(51) Int. Cl.
*H04L 29/08* (2006.01)
*G06F 17/16* (2006.01)
*H04L 12/911* (2013.01)
*H04L 12/861* (2013.01)

(52) U.S. Cl.
CPC .......... *H04L 67/1097* (2013.01); *G06F 17/16* (2013.01); *H04L 47/70* (2013.01); *H04L 67/2842* (2013.01); *H04L 49/90* (2013.01)

(58) Field of Classification Search
CPC . H04L 67/1097; H04L 47/70; H04L 67/2842; G06F 17/16
See application file for complete search history.

(56) References Cited

U.S. PATENT DOCUMENTS

| 2004/0015599 | A1* | 1/2004 | Trinh | G06F 9/3885 709/232 |
| 2011/0173399 | A1* | 7/2011 | Chen | G06F 11/348 711/154 |
| 2012/0185614 | A1* | 7/2012 | Reed | G06F 12/0802 709/250 |

OTHER PUBLICATIONS

Jheng et al., "FPGA Acceleration of Sparse Matrix-Vector Multiplication Based on Network-on-Chip", 19th European Signal Processing Conference, (EUSIPCO 2011), Aug. 29-Sep. 2, 2011, p. 744-748, 5 pages.*

(Continued)

*Primary Examiner* — Arvin Eskandarnia
*Assistant Examiner* — Amy Ling
(74) *Attorney, Agent, or Firm* — Meyertons Hood Kivlin Kowert & Goetzel, P.C.; Jeffrey C. Hood; Michael B. Davis

(57) ABSTRACT

Techniques are disclosed relating to parallel computing. In some embodiments, fine-grained data communication facilitates operations on large data sets such as multiplication of a sparse matrix by a vector. In this example, a first data set (the matrix) and a second data set (the vector) are distributed across multiple processing nodes. Performance of the overall multiplication operation may require communication of data among the processing nodes. In various embodiments, fine-grained communication of this data may reduce processing times and/or power consumption by avoiding congestion.

19 Claims, 12 Drawing Sheets

(56) References Cited

OTHER PUBLICATIONS

Yuang et al., "A Scalable Distributed Memory Architecture for Network on Chip", Circuits and Systems, 2008. APCCAS 2008. IEEE Asia Pacific Conference on Nov. 30-Dec. 3, 2008, IEEE Jan. 9, 2009, p. 1260-1263, 4 pages.*
Williams et al. "Optimization of Sparse Matrix-Vector Multiplication of Emerging Multicore Platforms", SC '07 Proceedings of the 2007 ACM/IEEE conference on Supercomputing Article No. 38, Nov. 10-16, 2007, 12 pages.*
IPRP1, "International Preliminary Report on Patentability", Apr. 4, 2017, The International Bureau of WIPO, 9 pages.*

* cited by examiner

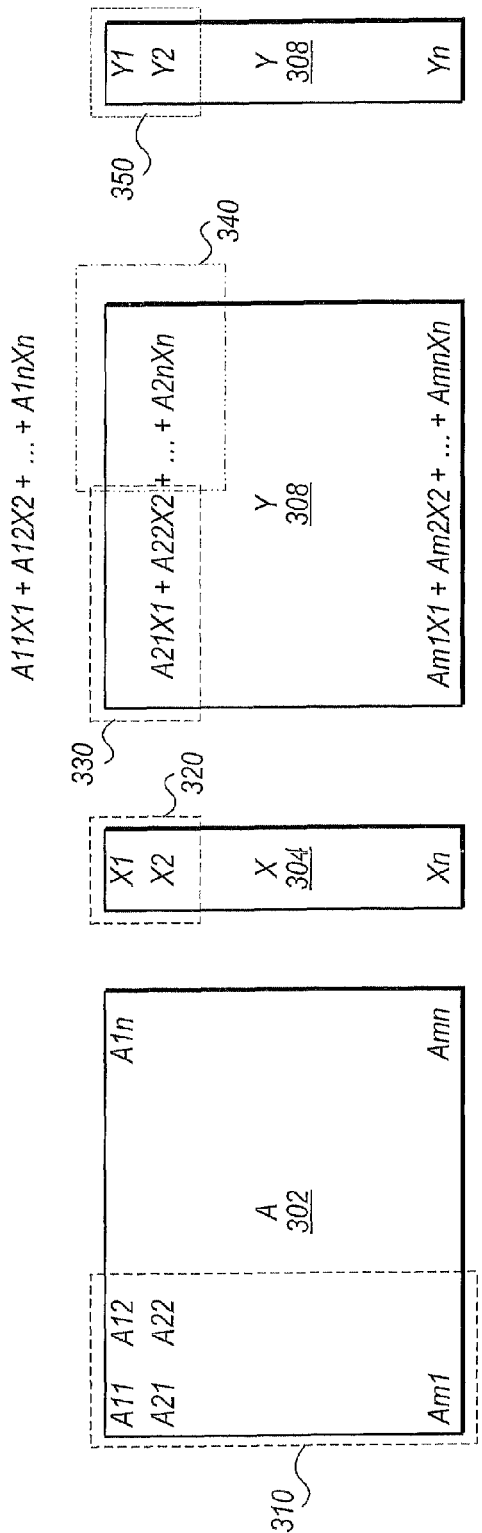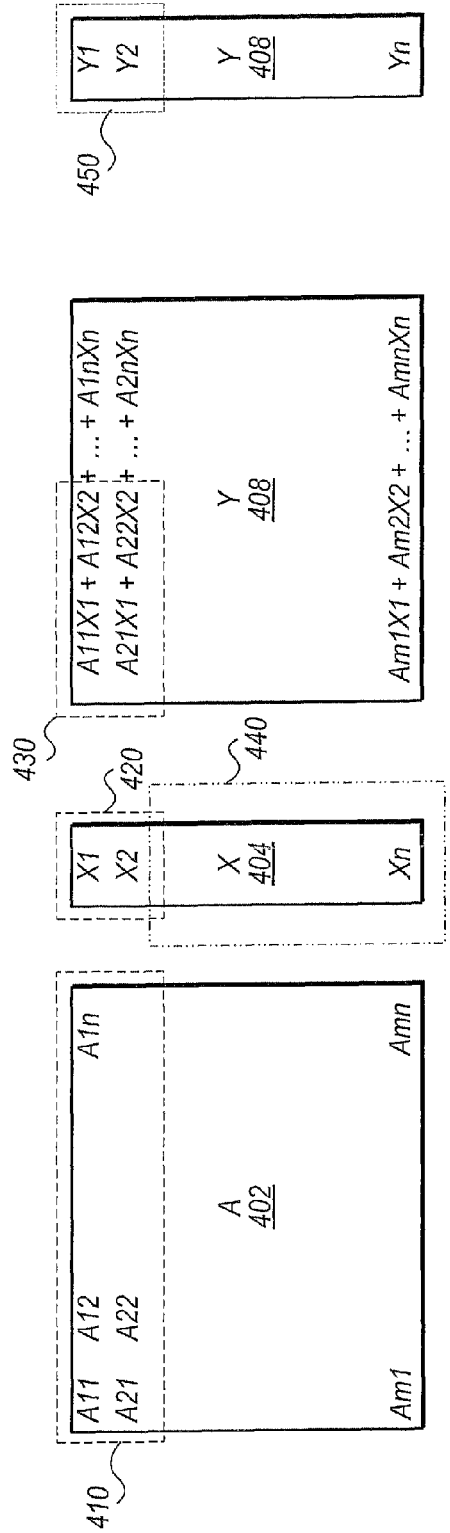

| Addresses Corresponding to A-matrix Entries 510 | Received X-Vector Values 512 | Addresses Corresponding to A-matrix Entries 520 | Received X-Vector Values 522 | X-Vector Portion 530 |
|---|---|---|---|---|

FIG. 5

MATRIX VECTOR MULTIPLY TECHNIQUES

This application claims the benefit of U.S. Provisional Application No. 62/057,793, filed on Sep. 30, 2014 and U.S. Provisional Application No. 62/076,827, filed on Nov. 7, 2014; these applications are incorporated by reference herein in their entireties.

CROSS-REFERENCE TO RELATED PATENTS

The disclosed techniques are related to subject matter disclosed in the following patents and patent applications that are incorporated by reference herein in their entirety:

U.S. Pat. No. 5,996,020 entitled, "A Multiple Level Minimum Logic Network", naming Coke S. Reed as inventor;

U.S. Pat. No. 6,289,021 entitled, "A Saleable Low Latency Switch for Usage in an Interconnect Structure", naming John Hesse as inventor;

U.S. Pat. No. 6,754,207 entitled, "Multiple Path Wormhole Interconnect", naming John Hesse as inventor;

U.S. patent application Ser. No. 11/925,546 entitled, "Network Interface Device for Use in Parallel Computing Systems," naming Coke Reed as inventor; and U.S. patent application Ser. No. 13/297,201 entitled "Parallel Information System Utilizing Flow Control and Virtual Channels," naming Coke S. Reed, Ron Denny, Michael Ives, and Thaine Hock as inventors.

TECHNICAL FIELD

The present disclosure relates to distributed computing systems, and more particularly to systems configured to perform sparse matrix vector multiplication.

DESCRIPTION OF THE RELATED ART

The multiplication of a sparse matrix by a vector is a common computing operation. A sparse matrix typically has a small number of relevant (e.g., non-zero) entries relative to its overall size. When a matrix and/or vector is sufficiently large, it may not fit into the system memory space of a given processor and thus may be distributed across multiple processors. To perform matrix-vector multiplication, the dot product of the vector and each row in the matrix is taken. Therefore, transferring data among processors may be necessary in order to perform a multiplication of large vectors. This may cause network congestion, especially because processors are typically configured to communicate at the granularity of a full cache line of data.

BRIEF DESCRIPTION OF THE DRAWINGS

A better understanding of the present disclosure may be obtained when the following detailed description is considered in conjunction with the following drawings, in which:

FIG. 3 is a diagram illustrating an exemplary column-based matrix-vector multiplication technique, according to some embodiments;

FIG. 4 is a diagram illustrating an exemplary row-based matrix-vector multiplication technique, according to some embodiments;

FIG. 5 is a block diagram illustrating exemplary contents of a NIC SRAM during row-based operations, according to some embodiments;

Figure 1A:
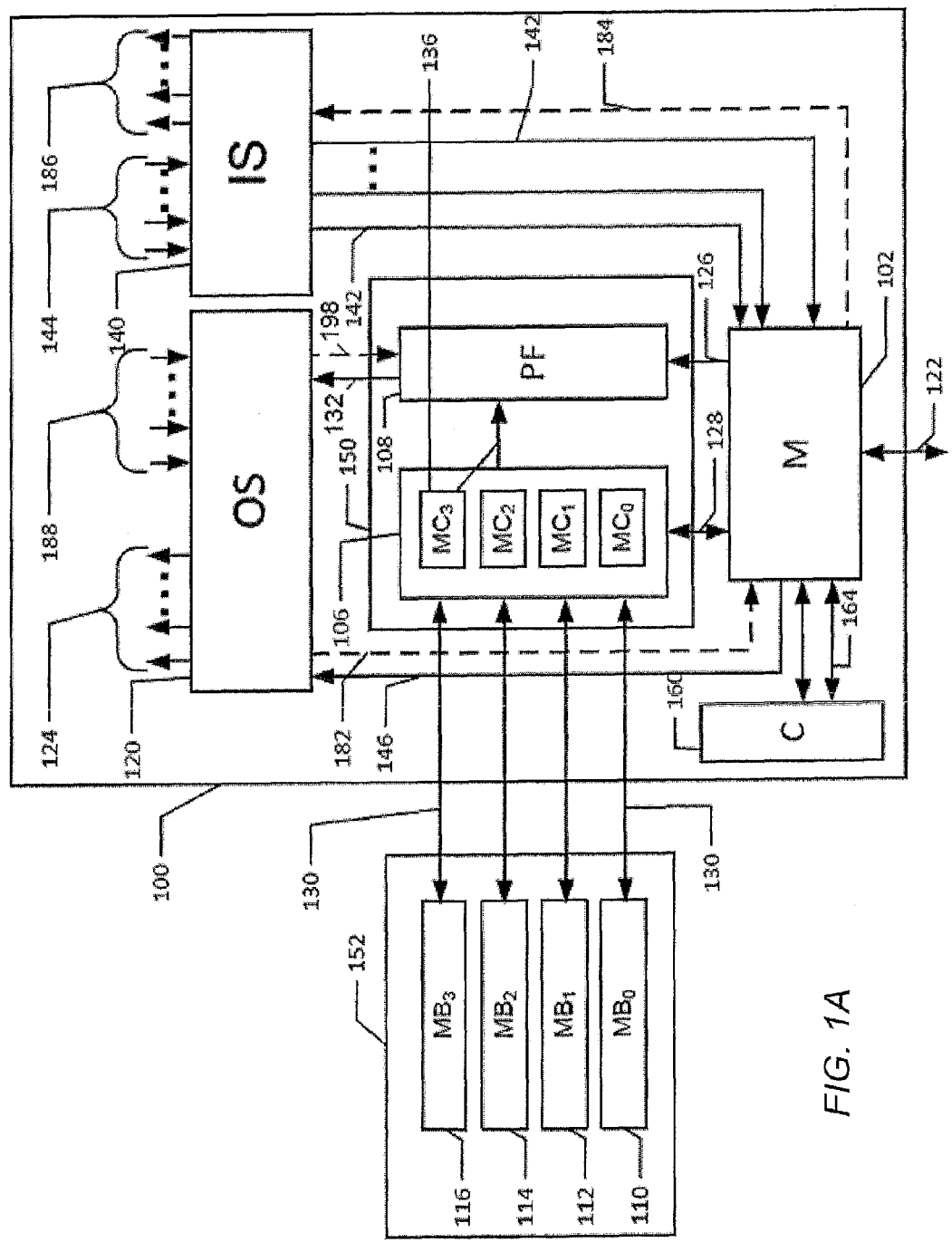
FIG. 1A illustrates an embodiment of a partially populated network interface controller (NIC) and a portion of the off-circuit static random access memory (SRAM) vortex register memory components.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

DETAILED DESCRIPTION

This disclosure initially describes, with reference to FIGS. 1A-2F, exemplary embodiments of a data vortex computing system. Exemplary fine-grained parallel computing techniques are then discussed with reference to FIGS. 3-7. Much of the disclosure uses matrix-vector multiplication as an example operation to be performed, including both column-based and row-based approaches. In various embodiments, the disclosed techniques may reduce data congestion when performing operations on large input data sets, among other advantages.

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

U.S. patent application Ser. No. 11/925,546 describes an efficient method of interfacing the network to the processor, which is improved in several aspects by the system disclosed herein. In a system that includes a collection of processors and a network connecting the processors, efficient system operation depends upon a low-latency-high-bandwidth processor to network interface.

U.S. patent application Ser. No. 11/925,546 describes an extremely low latency processor to network interface. The system disclosed herein further reduces the processor to network interface latency. A collection of network interface system working registers, referred to herein as vortex registers, facilitate improvements in the system design. The system disclosed herein enables logical and arithmetical operations that may be performed in these registers without the aid of the system processors. Another aspect of the disclosed system is that the number of vortex registers has been greatly increased and the number and scope of logical operations that may be performed in these registers, without resorting to the system processors, is expanded.

The disclosed system enables several aspects of improvement. A first aspect of improvement is to reduce latency by a technique that combines header information stored in the NIC vortex registers with payloads from the system processors to form packets and then inserting these packets into the central network without ever storing the payload section of the packet in the NIC. A second aspect of improvement is to reduce latency by a technique that combines payloads stored in the NIC vortex registers with header information from the system processors to form packets and then inserting these packets into the central network without ever storing the header section of the packet in the NIC. The two techniques lower latency and increase the useful information in the vortex registers. In U.S. patent application Ser. No. 11/925,546, a large collection of arithmetic and logical units are associated with the vortex registers. In U.S. patent application Ser. No. 11/925,546, the vortex registers may be custom working registers on the chip. The system disclosed herein may use random access memory (SRAM or DRAM) for the vortex registers with a set of logical units associated with each bank of memory, enabling the NIC of the disclosed system to contain more vortex registers than the NIC described in U.S. patent application Ser. No. 11/925,546, thereby allowing fewer logical units to be employed. Therefore, the complexity of each of the logical units may be greatly expanded to include such functions as floating point operations. The extensive list of such program in memory (PIM) operations includes atomic read-modify-write operations enabling, among other things, efficient program control. Another aspect of the system disclosed herein is a new command that creates two copies of certain critical packets and sends the copies through separate independent networks. For many applications, this feature squares the probability of the occurrence of a non-correctable error. A system of counters and flags enables the higher level software to guarantee a new method of eliminating the occurrence of non-correctable errors in other data transfer operations. Another aspect of the disclosed system enables multiple physical or virtual channels to guarantee for non-blocking operation for packets that are inserted into the network without the use of the system processor at the transmitting NIC.

An Overview of NIC Hardware

FIG. 1A illustrates components of a Network Interface Controller (NIC) 100 and associated memory banks 152 which may be vortex memory banks formed of data vortex registers. The NIC communicates with a processor local to the NIC and also with Dynamic Random Access Memory (DRAM) through link 122. In some embodiments, link 122 may be a HyperTransport link, in other embodiments, link 122 may be a Peripheral Component Interconnect (PCI) express link. Other suitable links may also be used. The NIC may transfer data packets to central network switches through lines 124. The NIC receives data packets from central network switches through lines 144. Control information is passed on lines 182, 184, 186, and 188. An output switch 120 scatters packets across a plurality of network switches (not shown). An input switch 140 gathers packets from a plurality of network switches (not shown). The input switch then routes the incoming packets into bins in the traffic management module M 102. The processor (not shown) that is connected to NIC 100 is capable of sending and receiving data through line 122. The vortex registers introduced in U.S. patent application Ser. No. 11/925,546 and discussed in detail in the present disclosure are stored in Static Random Access Memory (SRAM) or in some embodiments DRAM. The SRAM vortex memory banks are connected to NIC 100 by lines 130. Unit 106 is a memory controller logic unit (MCLU) and may contain: 1) a plurality of memory controller units; 2) logic to control the flow of data between the memory controllers and the packet-former PF 108; and 3) processing units to perform atomic operations. A plurality of memory controllers located in unit 106 controls the data transfer between the packet former 108 in the NIC and the SRAM vortex memory banks 152. In case a processor PROC is connected to a particular NIC 100 and an SRAM memory bank containing a vortex register VR is also connected to the NIC 100, the vortex register may be defined as and termed a Local Vortex Register of the processor PROC. In case vortex register VR is in an SRAM connected to a NIC that is not connected to the given processor PROC, then vortex register VR may be defined as and termed a Remote Vortex Register of processor PROC. The packet-forming module PF 108 forms a packet by either: 1) joining a header stored in the vortex register memory bank 152 with a payload sent to PF from a processor through link 122 or; 2) joining a payload stored in the vortex register memory bank with a header sent to packet-forming module PF from the processor through links 122 and 126. A useful aspect of the disclosed system is the capability for simultaneous transfer of packets between the NIC 100 and a plurality of remote NICs. These transfers are divided into transfer groups. A collection of counters in a module C 160 keep track of the number of packets in each transfer group that enter the vortex registers in SRAM 152 from remote NICs. The local processor is capable of examining the contents of the counters in module C to determine when NIC 100 has received all of the packets associated with a particular transfer. In addition to forming packets in unit 150, in some embodiments the packets may be formed in the processor and sent to the output switch through line 146.

Figure 1B:
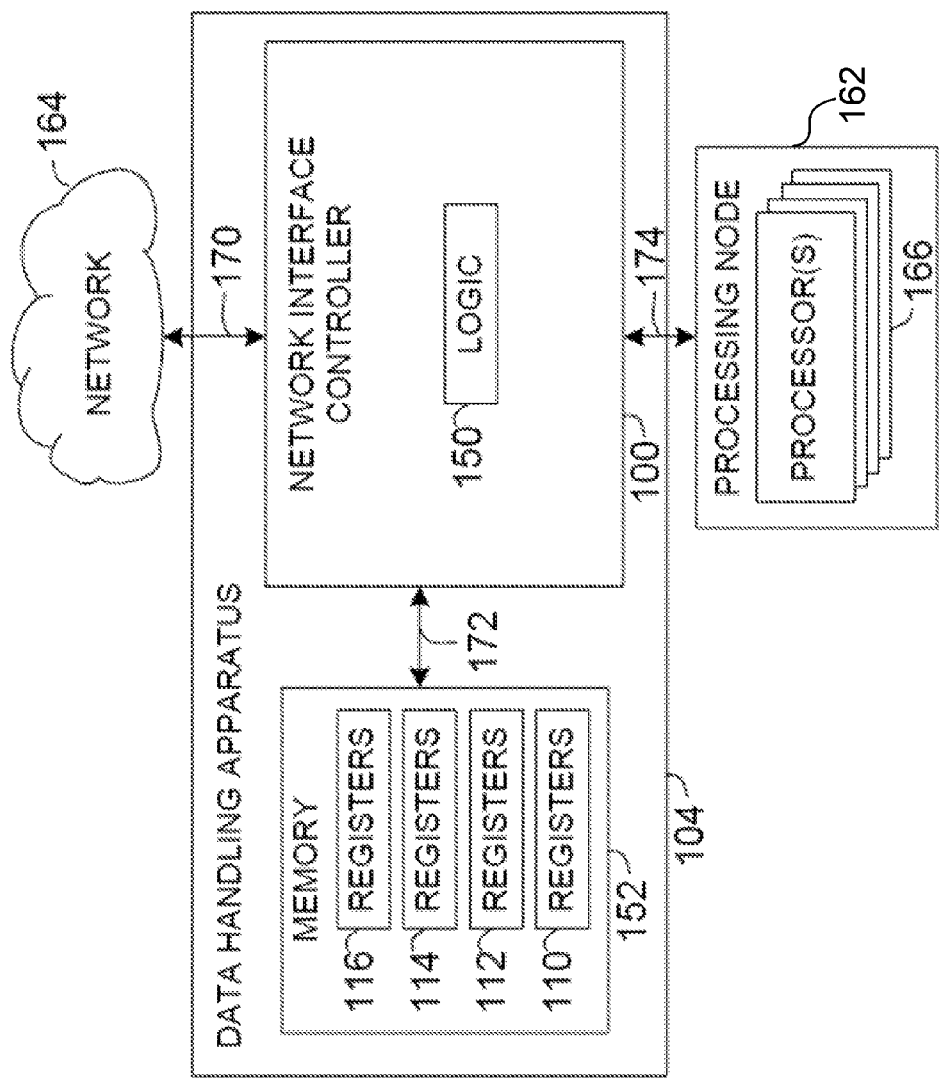
FIG. 1B is a schematic block diagram depicting an example embodiment of a data handling apparatus

In an illustrative embodiment, as shown in FIGS. 1A and 1B, a data handling apparatus 104 may comprise a network interface controller 100 configured to interface a processing node 162 to a network 164. The network interface controller 100 may comprise a network interface 170, a register interface 172, a processing node interface 174, and logic 150. The network interface 170 may comprise a plurality of lines 124, 188, 144, and 186 coupled to the network for communicating data on the network 164. The register interface 172 may comprise a plurality of lines 130 coupled to a plurality of registers 110, 112, 114, and 116. The processing node interface 174 may comprise at least one line 122 coupled to the processing node 162 for communicating data with a local processor local to the processing node 162 wherein the local processor 166 may be configured to read data to and write data from the plurality of registers 110, 112, 114, and 116. The logic 150 configured to receive packets comprising a header and a payload from the network 164 and further configured to insert the packets into ones of the plurality of registers 110, 112, 114, and 116 as indicated by the header.

In various embodiments, the network interface 170, the register interface 172, and the processing node interface 174 may take any suitable forms, whether interconnect lines, wireless signal connections, optical connections, or any other suitable communication technique.

In some embodiments, the data handling apparatus 104 may also comprise a processing node 162 and one or more processors 166.

In some embodiments and/or applications, an entire computer may be configured to use a commodity network (such as Infiniband or Ethernet) to connect among all of the processing nodes and/or processors. Another connection may be made between the processors by communicating through a Data Vortex network formed by network interconnect controllers NICs 100 and vortex registers. Thus, a programmer may use standard Message Passing Interface (MPI) programming without using any Data Vortex hardware and use the Data Vortex Network to accelerate more intensive processing loops. The processors may access mass storage through the Infiniband network, reserving the Data Vortex Network for the fine-grained parallel communication that is highly useful for solving difficult problems.

In some embodiments, a data handling apparatus 104 may comprise a network interface controller 100 configured to interface a processing node 162 to a network 164. The network interface controller 100 may comprise a network interface 170, a register interface 172, a processing node interface 174, and a packet-former 108. The network interface 170 may comprise a plurality of lines 124, 188, 144, and 186 coupled to the network for communicating data on the network 164. The register interface 170 may comprise a plurality of lines 130 coupled to a plurality of registers 110, 112, 114, and 116. The processing node interface 174 may comprise at least one line 122 coupled to the processing node 162 for communicating data with a local processor local to the processing node 162 wherein the local processor may be configured to read data to and write data from the plurality of registers 110, 112, 114, and 116. The packet-former 108 may be configured form packets comprising a header and a payload. The packet-former 108 may be configured to use data from the plurality of registers 110, 112, 114, and 116 to form the header and to use data from the local processor to form the payload, and configured to insert formed packets onto the network 164.

In some embodiments and/or applications, the packet-former 108 configured form packets comprising a header and a payload such that the packet-former 108 uses data from the local processor to form the header and uses data from the plurality of registers 110, 112, 114, and 116 to form the payload. The packet-former 108 may be further configured to insert the formed packets onto the network 164.

The network interface controller 100 may be configured to simultaneously transfer a plurality of packet transfer groups.

Packet Types

At least two classes of packets may be specified for usage by the illustrative NIC system 100. A first class of packets (CPAK packets) may be used to transfer data between the processor and the NIC. A second class of packets (VPAK packets) may be used to transfer data between vortex registers.

Referring to FIG. 2, embodiments of packet formats are illustrated. The CPAK packet 202 has a payload 204 and a header 208. The payload length of the CPAK packet is predetermined to be a length that the processor uses in communication. In many commodity processors, the length of the CPAK payload is the cache line length. Accordingly, the CPAK packet 202 contains a cache line of data. In illustrative embodiments, the cache line payload of CPAK may contain 64 bytes of data. The payload of such a packet may be divided into eight data fields 206 denoted by F0, F1, . . . , F7. The header contains a base address field BA 210 containing the address of the vortex register designated to be involved with the CPAK packet 202. The header field contains an operation code COC 212 designating the function of the packet. The field CTR 214 is reserved to identify a counter that is used to keep track of packets that arrive in a given transfer. The use of the CTR field is described hereinafter. A field ECC 216 contains error correction information for the packet. In some embodiments, the ECC field may contain separate error correction bits for the payload and the header. The remainder of the bits in the header are in a field 218 that is reserved for additional information. In one useful aspect of the CPAK packet functionality, each of the data fields may contain the payload of a VPAK packet. In another useful aspect of the CPAK packet functionality, each of the data fields FK may contain a portion of the header information of a VPAK packet. When data field FK is used to carry VPAK header information, FK has a header information format 206 as illustrated in FIG. 2. A GVRA field 222 contains the global address of a vortex register that may be either local or remote. The vortex packet OP code denoted by VOC is stored in field 226. A CTR field 214 identifies the counter that may be used to monitor the arrival of packets in a particular transfer group. Other bits in the packet may be included in field 232. In some embodiments, the field 232 bits are set to zero.

Figure 2A:
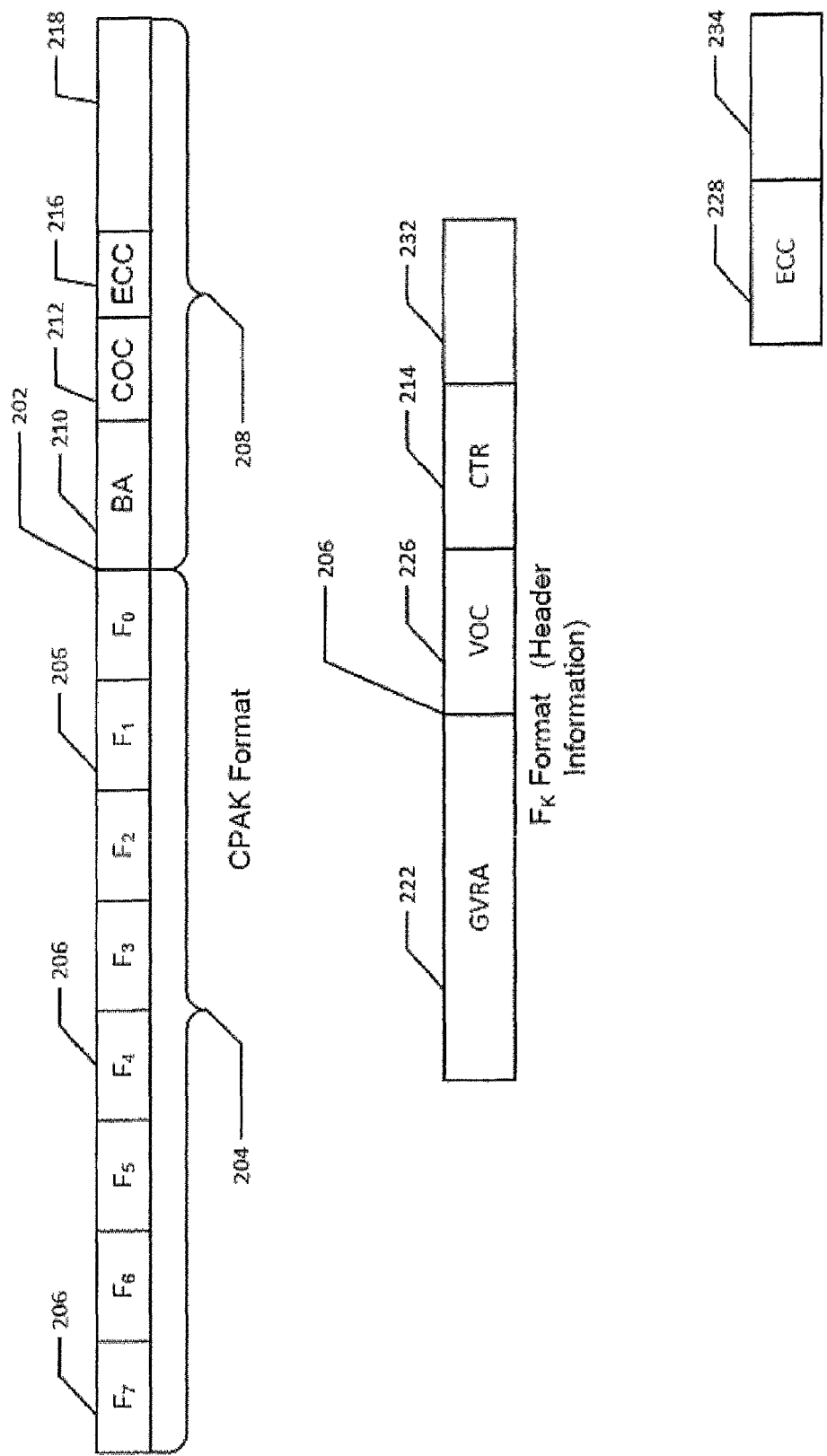
FIG. 2A illustrates an embodiment of formats of two types of packets: 1) a CPAK packet with a 64-byte payload and; 2) a VPAK packet with a 64 bit payload.

Accordingly, referring to FIG. 1A in combination with FIG. 2A, the data handling apparatus 104 may further comprise the local processor (not shown) local to the processing node 162 coupled to the network interface controller 100 via the processing node interface 174. The local processor may be configured to send a packet CPAK 202 of a first class to the network interface controller 100 for storage in the plurality of registers wherein the packet CPAK comprises a plurality of K fields F0, F1, . . . FK−1. Fields of the plurality of K fields F0, F1, . . . FK−1 may comprise a global address GVRA of a remote register, an operation code VOC, and a counter CTR 214 configured to be decremented in response to arrival of a packet at a network interface controller 100 that is local to the remote register identified by the global address GVRA. The first class of packets CPAK 202 specifies usage for transferring data between the local processor and the network interface controller 100.

In some embodiments, one or more of the plurality of K fields F0, F1, . . . FK−1 may further comprise an error correction information ECC 216.

In further embodiments, the packet CPAK 202 may further comprise a header 208 which includes an operation code COC 212 indicative of whether the plurality of K fields F0, F1, . . . FK−1 are to be held locally in the plurality of registers coupled to the network interface controller 100 via the register interface 172.

In various embodiments, the packet CPAK 202 may further comprise a header 208 which includes a base address BA indicative of whether the plurality of K fields F0, F1, . . . FK−1 are to be held locally at ones of the plurality of registers coupled to the network interface controller 100 via the register interface 172 at addresses BA, BA+1, BA+K−1.

Furthermore, the packet CPAK 202 may further comprise a header 208 which includes error correction information ECC 216.

In some embodiments, the data handling apparatus 104 may further comprise the local processor which is local to the processing node 162 coupled to the network interface controller 100 via the processing node interface 174. The local processor may be configured to send a packet CPAK 202 of a first class to the network interface controller 100 via the processing node interface 174 wherein the packet CPAK 202 may comprise a plurality of K fields G0, G1, . . . GK−1, a base address BA, an operation code COC 212, and error correction information ECC 216.

The operation code COC 212 is indicative of whether the plurality of K fields G0, G1, . . . GK−1 are payloads 204 of packets wherein the packet-former 108 forms K packets. The individual packets include a payload 204 and a header 208. The header 208 may include information for routing the payload 204 to a register at a predetermined address.

The second type of packet in the system is the vortex packet. The format of a vortex packet VPAK 230 is illustrated in FIG. 2. In the illustrative example, the payload 220 of a VPAK packet contains 64 bits of data. In other embodiments, payloads of different sizes may be used. In addition to the global vortex register address field GVRA 222 and the vortex OP code field 226, the header also contains the local NIC address LNA 224 an error correction code ECC 228 and a field 234 reserved for additional bits. The field CTR 214 identifies the counter to be used to monitor the arrival of vortex packets that are in the same transfer group as packet 230 and arrive at the same NIC as 230. In some embodiments, the field may be set to all zeros.

The processor uses CPAK packets to communicate with the NIC through link 122. VPAK packets exit NIC 100 through lines 124 and enter NIC 100 through lines 144. The NIC operation may be described in terms of the use of the two types of packets. For CPAK packets, the NIC performs tasks in response to receiving CPAK packets. The CPAK packet may be used in at least three ways including: 1) loading the local vortex registers; 2) scattering data by creating and sending a plurality of VPAK packets from the local NIC to a plurality of NICs that may be either local or remote; and: 3) reading the local vortex registers.

Thus, referring to FIG. 1A in combination with FIG. 2A, the logic 150 may be configured to receive a packet VPAK 230 from the network 164, perform error correction on the packet VPAK 230, and store the error-corrected packet VPAK 230 in a register of the plurality of registers 110, 112, 114, and 116 specified by a global address GVRA 222 in the header 208.

In some embodiments, the data handling apparatus 104 may be configured wherein the packet-former 108 is configured to form a plurality K of packets VPAK 230 of a second type P0, P1, . . . , PK−1 such that for an index W. A packet Pw includes a payload GW and a header containing a global address GVRA 222 of a target register, a local address LNA 224 of the network interface controller 100, a packet operation code 226, a counter CTR 214 that identifies a counter to be decremented upon arrival of the packet Pw, and error correction code ECC 228 that is formed by the packet-former 108 when the plurality K of packets VPAK 230 of the second type have arrived.

In various embodiments, the data handling apparatus 104 may comprise the local processor 166 local to the processing node 162 which is coupled to the network interface controller 100 via the processing node interface 174. The local processor 166 may be configured to receive a packet VPAK 230 of a second class from the network interface controller 100 via the processing node interface 162. The network interface controller 100 may be operable to transfer the packet VPAK 230 to a cache of the local processor 166 as a CPAK payload and to transform the packet VPAK 230 to memory in the local processor 166.

Thus, processing nodes 162 may communicate CPAK packets in and out of the network interface controller NIC 100 and the NIC vortex registers 110, 112, 114, and 116 may exchange data in VPAK packets 230.

The network interface controller 100 may further comprise an output switch 120 and logic 150 configured to send the plurality K of packets VPAK of the second type P0, P1, . . . , PK−1 through the output switch 120 into the network 164.

Loading the Local Vortex Register Memories

The loading of a cache line into eight Local Vortex Registers may be accomplished by using a CPAK to carry the data in a memory-mapped I/O transfer. The header of CPAK contains an address for the packet. A portion of the bits of the address (the BA field 210) corresponds to a physical base address of vortex registers on the local NIC. A portion of the bits correspond to an operation code (OP code) COC 212. The header may also contain an error correction field 216. Therefore, from the perspective of the processor, the header of a CPAK packet is a target address. From the perspective of the NIC, the header of a CPAK packet includes a number of fields with the BA field being the physical address of a local vortex register and the other fields containing additional information. In an illustrative embodiment, the CPAK operation code (COC 212) set to zero signifies a store in local registers. In an another aspect of an illustrative embodiment, four banks of packet header vortex register memory banks are illustrated. In other embodiments, a different number of SRAM banks may be employed. In an illustrative embodiment, the vortex addresses VR0, VR1, . . . VRNMAX−1 are striped across the banks so that VR0 is in MB0110, VR1 is in MB1112, VR2 is in MB2114, VR3 is in MB3 116, VR4 is in MB0 and so forth. To store the sequence of eight 64 bit values in addresses VRN, VRN+1, . . . , VRN+7, a processor sends the cache line as a payload in a packet CPAK to the NIC. The header of CPAK contains the address of the vortex register VRN along with additional bits that govern the operation of the NIC. In case CPAK has a header which contains the address of a local vortex register memory along with an operation code (COC) field set to 0 (the "store operation" code in one embodiment), the payload of CPAK is stored in Local Vortex Register SRAM memory banks.

Hence, referring to FIG. 1A in combination with FIG. 2, the local processor which is local to the processing node 162 may be configured to send a cache line of data locally to the plurality of registers coupled to the network interface controller 100 via the register interface 172.

In some embodiments, the cache line of data may comprise a plurality of elements F0, F1, . . . FN.

CPAK has a header base address field BA which contains the base address of the vortex registers to store the packet. In a simple embodiment, a packet with BA set to N is stored in vortex memory locations VN, VN+1, . . . , VN+7. In a more general embodiment a packet may be stored in J vortex memory locations V[AN], V[AN+B], V[AN+2B], . . . , V[AN+(J−1)B]. with A, B, and J being passed in the field 218.

The processor sends CPAK through line 122 to a packet management unit M 102. Responsive to the OC field set to "store operation", M directs CPAK through line 128 to the memory controller MCLU 106. In FIG. 1A, a single memory controller is associated with each memory bank. In other applications, a memory controller may be associated with multiple SRAM banks.

In other embodiments, additional op code fields may store a subset of the cache line in prescribed strides in the vortex memories. A wide range of variations to the operations described herein may be employed.

Reading the Local Vortex Registers

The processor reads a cache line of data from the Local Vortex Registers VN, VN+1, . . . , VN+7 by sending a request through line 122 to read the proper cache line. The form of the request depends upon the processor and the format of link 122. The processor may also initiate a direct memory access function DMA that transfers a cache line of data directly to DRAM local to the processor. The engine (not illustrated in FIG. 1A) that performs the DMA may be located in MCLU 106.

Scattering Data Across the System Using Addresses Stored in Vortex Registers

Some embodiments may implement a practical method for processors to scatter data packets across the system. The techniques enable processors and NICs to perform large corner-turns and other sophisticated data movements such as bit-reversal. After setup, these operations may be performed without the aid of the processors. In a basic illustrative operation, a processor PROC sends a cache line CL including, for example, the eight 64-bit words D0, D1, . . . , D7 to eight different global addresses AN0, AN1, . . . , AN7 stored in the Local Vortex Registers VN, VN+1, . . . , VN+7. In other embodiments, the number of words may not be eight and the word length may not be 64 bits. The eight global addresses may be in locations scattered across the entire range of vortex registers. Processor PROC sends a packet CPAK 202 with a header containing an operation code field, COC 212, (which may be set to 1 in the present embodiment) indicating that the cache line contains eight payloads to be scattered across the system in accordance with eight remote addresses stored in Local Vortex Registers. CPAK has a header base address field BA which contains the base address of VN. In a first case, processor PROC manufactures cache line CL. In a second case, processor PROC receives cache line CL from DRAM local to the processor PROC. In an example embodiment, the module M may send the payload of CPAK and the COC field of CPAK down line 126 to the packet-former PF 108 and may send the vortex address contained in the header of VPAK down line 128 to the memory controller system. The memory controller system 106 obtains eight headers from the vortex register memory banks and sends these eight 64 bit words to the packet-former PF 108. Hardware timing coordinates the sending of the payloads on line 126 and headers on line 136 so that the two halves of the packet arrive at the packet-former at the same time. In response to a setting of 1 for the operation code COC, the packet-former creates eight packets using the VPAK format illustrated in FIG. 2. The field Payload 220 is sent to the packet-former PF 108 in the CPAK packet format. The fields GVRA 222 and VOC 226 are transferred from the vortex memory banks through lines 130 and 136 to the packet-former PF. The local NIC address field (LNA field) 224 is unique to NIC 100 and is stored in the packet-former PF 108. The field CTR 214 may be stored in the FK field in VK. When the fields of the packet are assembled, the packet-former PF 108 builds the error correction field ECC 228.

In another example embodiment, functionality is not dependent on synchronizing the timing of the arrival of the header and the payload by packet management unit M. Several operations may be performed. For example, processor PROC may send VPAK on line 122 to packet management unit M 102. In response to the operation code OC value of 1, packet management unit M sends cache line CL down line 126 to the packetformer, PF 108. Packet-former PF may request the sequence VN, VN+1, . . . , VN+7 by sending a request signal RS from the packet-former to the memory controller logic unit MCLU 106. The request signal RS travels through a line not illustrated in FIG. 1A. In response to request signal RS, memory controller MC accesses the SRAM banks and returns the sequence VN, VN+1, . . . , VN+7 to PF. Packet-former PF sends the sequence of packets (VN,D0), (VN+1,D1), (VN+7,D7) down line 132 to the output switch OS 120. The output switch then scatters the eight packets across eight switches in the collection of central switches. FIG. 1A shows a separate input switch 140 and output switch 120. In other embodiments these switches may be combined to form a single switch.

Scattering Data Across the System Using Payloads Stored in Vortex Registers

Another method for scattering data is for the system processor to send a CPAK with a payload containing eight headers through line 122 and the address ADR of a cache line of payloads in the vortex registers. The headers and payloads are combined and sent out of the NIC on line 124. In one embodiment, the OP code for this transfer is 2. The packet management unit M 102 and the packet-former PF 108 operate as before to unite header and payload to form a packet. The packet is then sent on line 132 to the output switch 120.

Sending Data Directly to a Remote Processor

A particular NIC may contain an input first-in-first-out buffer (FIFO) located in packet management unit M 102 that is used to receive packets from remote processors. The input FIFO may have a special address. Remote processors may send to the address in the same manner that data is sent to remote vortex registers. Hardware may enable a processor to send a packet VPAK to a remote processor without pre-arranging the transfer. The FIFO receives data in the form of 64-bit VPAK payloads. The data is removed from the FIFO in 64-byte CPAK payloads. In some embodiments, multiple FIFOs are employed to support quality-of-service (QoS) transfers. The method enables one processor to send a "surprise packet" to a remote processor. The surprise packets may be used for program control. One useful purpose of the packets is to arrange for transfer of a plurality of packets from a sending processor S to a receiving processor R. The setting up of a transfer of a specified number of packets from S to R may be accomplished as follows. Processor S may send a surprise packet to processor R requesting that processor R designates a block of vortex registers to receive the specified number of packets. The surprise packet also requests that processor R initializes specified counters and flags used to keep track of the transfer. Details of the counters and flags are disclosed hereinafter.

Accordingly, referring to FIG. 1A, the network interface controller 100 may further comprise a first-in first-out (FIFO) input device in the packet management unit M 102 such that a packet with a header specifying a special GVRA address causes the packet to be sent to the FIFO input device and the FIFO input device transfers the packet directly to a remote processor specified by the GVRA address.

Packets Assembled by the Processor

Sending VPAK packets without using the packet-former may be accomplished by sending a CPAK packet P from the processor to the packet management unit M with a header that contains an OP code indicating whether the VPAK packets in the payload are to be sent to local or remote memory. In one embodiment, the header may also set one of the counters in the counter memory C. By this procedure, a processor that updates Local Vortex Registers has a method of determining when that process has completed. In case the VPAK packets are sent to remote memory, the packet management unit M may route the said packets through line 146 to the output switch OS.

Gathering the Data

In the following, a "transfer group" may be defined to include a selected plurality of packet transfers. Multiple transfer groups may be active at a specified time. An integer N may be associated with a transfer group, so that the transfer group may be specified as "transfer group N." A NIC may include hardware to facilitate the movement of packets in a given transfer group. The hardware may include a collection of flags and counters ("transfer group counters" or "group counters").

Hence, referring to FIG. 1A in combination with FIG. 2A, the network interface controller 100 may further comprise a plurality of group counters 160 including a group with a label CTR that is initialized to a number of packets to be transferred to the network interface controller 100 in a group A.

In some embodiments, the network interface controller 100 may further comprise a plurality of flags wherein the plurality of flags are respectively associated with the plurality of group counters 160. A flag associated with the group with a label CTR may be initialized to zero the number of packets to be transferred in the group of packets. [0062] In various embodiments and/or applications, the plurality of flags may be distributed in a plurality of storage locations in the network interface controller 100 to enable a plurality of flags to be read simultaneously.

In some embodiments, the network interface controller 100 may further comprise a plurality of cache lines that contain the plurality of flags.

The sending and receiving of data in a given transfer group may be illustrated by an example. In the illustrative example, each node may have 512 counters and 1024 flags. Each counter may have two associated flags including a completion flag and an exception flag. In other example configurations, the number of flags and counters may have different values. The number of counters may be an integral multiple of the number of bits in a processor's cache line in an efficient arrangement.

Using an example notation, the Data Vortex® computing and communication device may contain a total of K NICs denoted by NIC0, NIC1, NIC2, . . . , NICK-1. A particular transfer may involve a plurality of packet-sending NICs and also a plurality of packet-receiving NICs. In some examples, a particular NIC may be both a sending NIC and also a receiving NIC. Each of the NICS may contain the transfer group counters TGC0, TGC1, TGC511. The transfer group counters may be located in the counter unit C 160. The timing of counter unit C may be such that the counters are updated after the memory bank update has occurred. In the illustrative example, NICJ associated with processor PROCJ may be involved in a number of transfer groups including the transfer group TGL. In transfer group TGL, NICJ receives NPAK packets into pre-assigned vortex registers. The transfer group counter TGCM on NICJ may be used to track the packets received by NICJ in TGL. Prior to the transfer: 1) TGCM is initialized to NPAK-1; 2) the completion flag associated with TGCM is set to zero; and 3) the exception flag associated with TGCM is set to zero. Each packet contains a header and a payload. The header contains a field CTR that identifies the transfer group counter number CN to be used by NICJ to track the packets of TGL arriving at NICJ. A packet PKT destined to be placed in a given vortex register VR in NICJ enters error correction hardware. In an example embodiment, the error correction for the header may be separate from the error correction for the payload. In case of the occurrence of a correctable error in PKT, the error is corrected. If no uncorrectable errors are contained in PKT, then the payload of PKT is stored in vector register VR and TGCCN is decremented by one. Each time TGCCN is updated, logic associated with TGCCN checks the status of TGCCN. When TGCM is negative, then the transfer of packets in TGL is complete. In response to a negative value in TGCCN, the completion flag associated with TGCCN is set to one.

Accordingly, the network interface controller 100 may further comprise a plurality of group counters 160 including a group with a label CTR that is initialized to a number of packets to be transferred to the network interface controller 100 in a group A. The logic 150 may be configured to receive a packet VPAK from the network 164, perform error correction on the packet VPAK, store the error-corrected packet VPAK in a register of the plurality of registers 110, 112, 114, and 116 as specified by a global address GVRA in the header, and decrement the group with the label CTR.

In some embodiments, the network interface controller 100 may further comprise a plurality of flags wherein the plurality of flags are respectively associated with the plurality of group counters 160. A flag associated with the group with a label CTR may be initialized to zero the number of packets to be transferred in the group of packets. The logic 150 may be configured to set the flag associated with the group with the label CTR to one when the group with the label CTR is decremented to zero.

The data handling application 104 may further comprise the local processor local to the processing node 162 coupled to the network interface controller 100 via the processing node interface 174. The local processor may be configured to determine whether the flag associated with the group with the label CTR is set to one and, if so, to indicate completion of transfer.

In case an uncorrectable error occurs in the header of PKT, then TGCCN is not modified, neither of the flags associated with TGCCN is changed, and no vortex register is modified. If no uncorrectable error occurs in the header of PKT, but an uncorrectable error occurs in the payload of PKT, then TGCCN is not modified, the completion flag is not modified, the exception flag is set to one, no vortex register is modified, and PKT is discarded.

The cache line of completion flags in NICJ may be read by processor PROCJ to determine which of the transfer groups have completed sending data to NICJ. In case one of the processes has not completed in a predicted amount of time, processor PROCJ may request retransmission of data. In some cases, processor PROCJ may use a transmission group number and transmission for the retransmission. In case a transmission is not complete, processor PROCJ may examine the cache line of exception flags to determine whether a hardware failure associated with the transfer.

Transfer Completion Action

A unique vortex register or set of vortex registers at location COMPL may be associated with a particular transfer group TGL. When a particular processor PROCJ involved in transfer group TGL determines that the transfer of all data associated with TGL has successfully arrived at NICL, processor PROCJ may move the data from the vortex registers and notify the vortex register or set of vortex registers at location COMPL that processor PROCJ has received all of the data. A processor that controls the transfer periodically reads COMPL to enable appropriate action associated with the completion of the transfer. A number of techniques may be used to accomplish the task. For example, location COMPL may include a single vortex register that is decremented or incremented. In another example location COMPL may include a group of words which are all initialized to zero with the Jth zero being changed to one by processor PROCJ when all of the data has successfully arrived at processor PROCJ, wherein processor PROCJ has prepared the proper vortex registers for the next transfer.

Reading Remote Vortex Registers

Figure 2B:
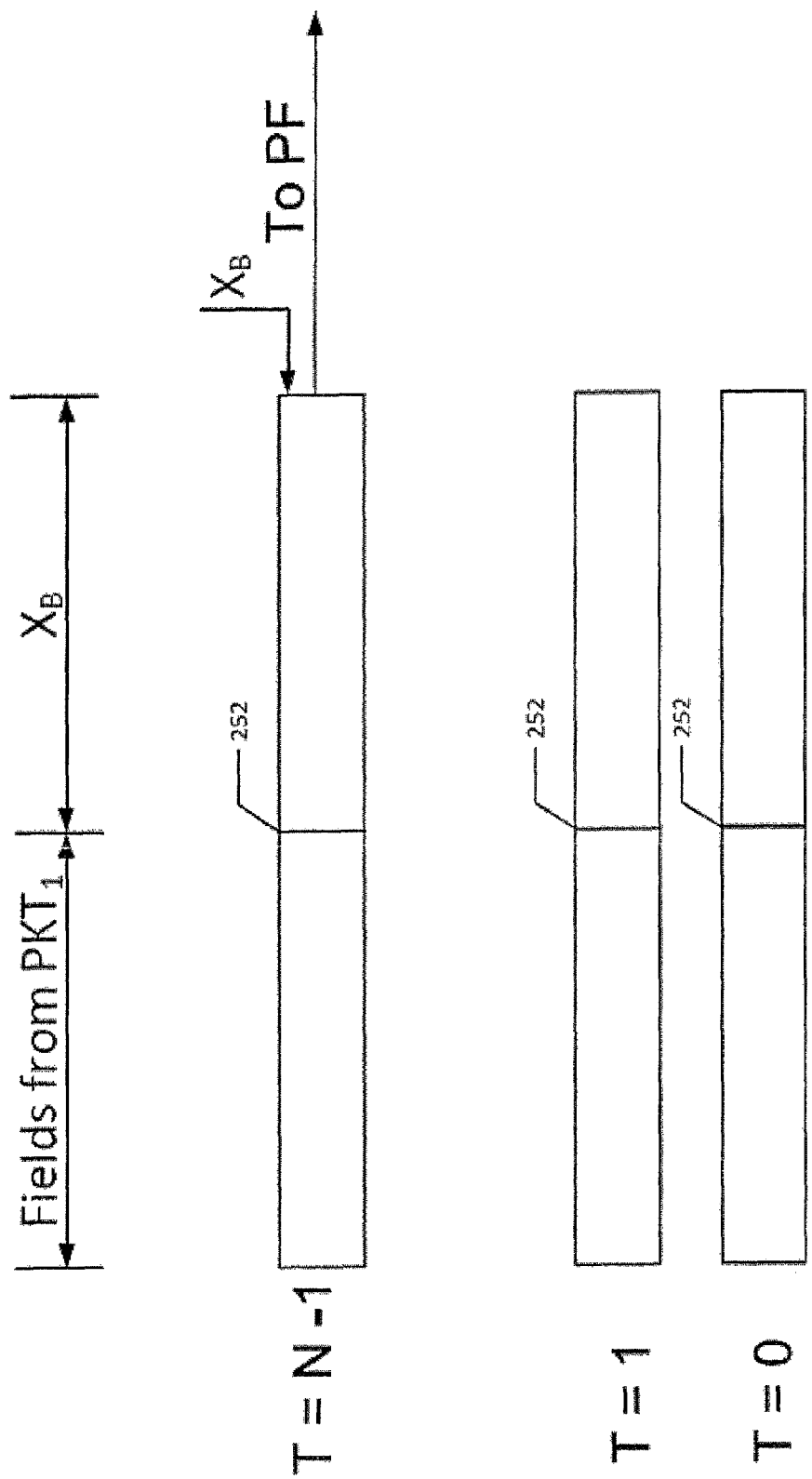
FIG. 2B illustrates an embodiment of a lookup first-in, first-out buffer (FIFO) that may be used in the process of accessing remote vortex registers.

One useful aspect of the illustrative system is the capability of a processor PROCA on node A to transfer data stored in a Remote Vortex Register to a Local Vortex Register associated with the processor PROCA. The processor PROCA may transfer contents XB of a Remote Vortex Register VRB to a vortex register VRA on a node A by sending a request packet PKT1 to the address of VRB, for example contained in the GRVA field 222 of the VPAK format illustrated in FIG. 2. The packet PKT1 containing the address of vortex register VRA in combination with a vortex operation code set to the predetermined value to indicate that a packet PKT2 which has a payload holding the content of vortex register VRB may be created and sent to the vortex register VRA. The packet PKT1 may also contain a counter identifier CTR that indicates which counter on node A is to be used for the transfer. The packet PKT1 arrives at the node B NIC 100 through the input switch 140 and is transported through lines 142 and 128 to the memory controller logic unit MCLU 106. Referring to FIG. 2B, a lookup FIFO (LUF) 252 is illustrated. In response to the arrival of packet PKT1, an MCLU memory controller MCK places the packet PKT1 in a lookup FIFO (LUF 252) and also requests data XB from the SRAM memory banks A time interval of length DT is interposed from the time that MCK requests data XB from the SRAM until XB arrives at MCLU 106. During the time interval DT, MCK may make multiple requests for vortex register contents, in request packets that are also contained in the LUF-containing packet PKT1. The LUF contains fields having all of the information used to construct PKT2 except data XB. Data XB arrives at MCLU and is placed in the FIFO-containing packet PKT1. The sequential nature of the requests ensures proper placement of the returning packets. All of the data used to form packet PKT2 are contained in fields alongside packet PKT1. The MCLU forwards data XB in combination with the header information from packet PKT1 to the packet-former PF 108 via line 136. The packet-former PF 108 forms the vortex packet PKT2 with format 230 and sends the packet through output switch OS to be transported to vortex register VRA.

In the section hereinabove entitled "Scattering data across the system using payloads stored in vortex registers," packets are formed by using header information from the processor and data from the vortex registers. In the present section, packets are formed using header information in a packet from a remote processor and payload information from a vortex register.

Sending Multiple Identical Packets to the Same Address

The retransmission of packets in the case of an uncorrectable error described in the section entitled "Transfer Completion Action" is an effective method of guaranteeing error free operation. The NIC has hardware to enable a high level of reliability in cases in which the above-described method is impractical, for example as described hereinafter in the section entitled, "Vortex Register PIM Logic." A single bit flag in the header of request packet may cause data in a Remote Vortex Register to be sent in two separate packets, each containing the data from the Remote Vortex Register. These packets travel through different independent networks. The technique squares the probability of an uncorrectable error.

Vortex Register PIM Logic

A useful aspect of the disclosed system includes the ability of a processor to read remote vortex memory. Furthermore, a processor PROCA may read and then alter the contents of a remote vortex register VRB, a particularly efficient technique because a processor on node A is able to read or modify single words on vortex memory in node B without involving the processor on node B. Moreover, the updates may occur in a way that guaranties atomicity. Additionally, the contents of vortex register VRB, prior to alteration, may be sent to a vortex register VRA on node A. Hardware associated with each vortex register memory bank is able to perform a number of functions f1, f2, . . . , fJ on the contents of vortex register VRB.

The processor PROCA is able to alter the contents of a remote vortex register VRB on NICB by sending a packet PKT1 to network interface controller NICB. The address of vortex register VRB is included in packet PKT1. In case the contents XB of vortex register VRB, prior to alteration, is to be returned to a vortex register VRA on node A, then containing the address of NICA, the address of vortex register VRA is included in packet PKT1. Also included in packet PKT1 is an integer W indicating that the function fW is to be used in the computation to alter contents XB. In case data D is to be used in the alteration of contents XB, then data D is included in the packet PKT1. The read-modify-write operation is performed by modifying the contents XB held in vortex register VRB by 1) reading the contents XB of vortex register VRB; 2) transferring contents XB to vortex register VRA in a packet PKT2 if the operation code requests such a transfer; 3) computing function fW(XB,D); 4) writing function fW(XB,D) into vortex register VRB. To avoid a race condition, these four operations are to be completed before vortex register VRB is read again.

Figure 2C:
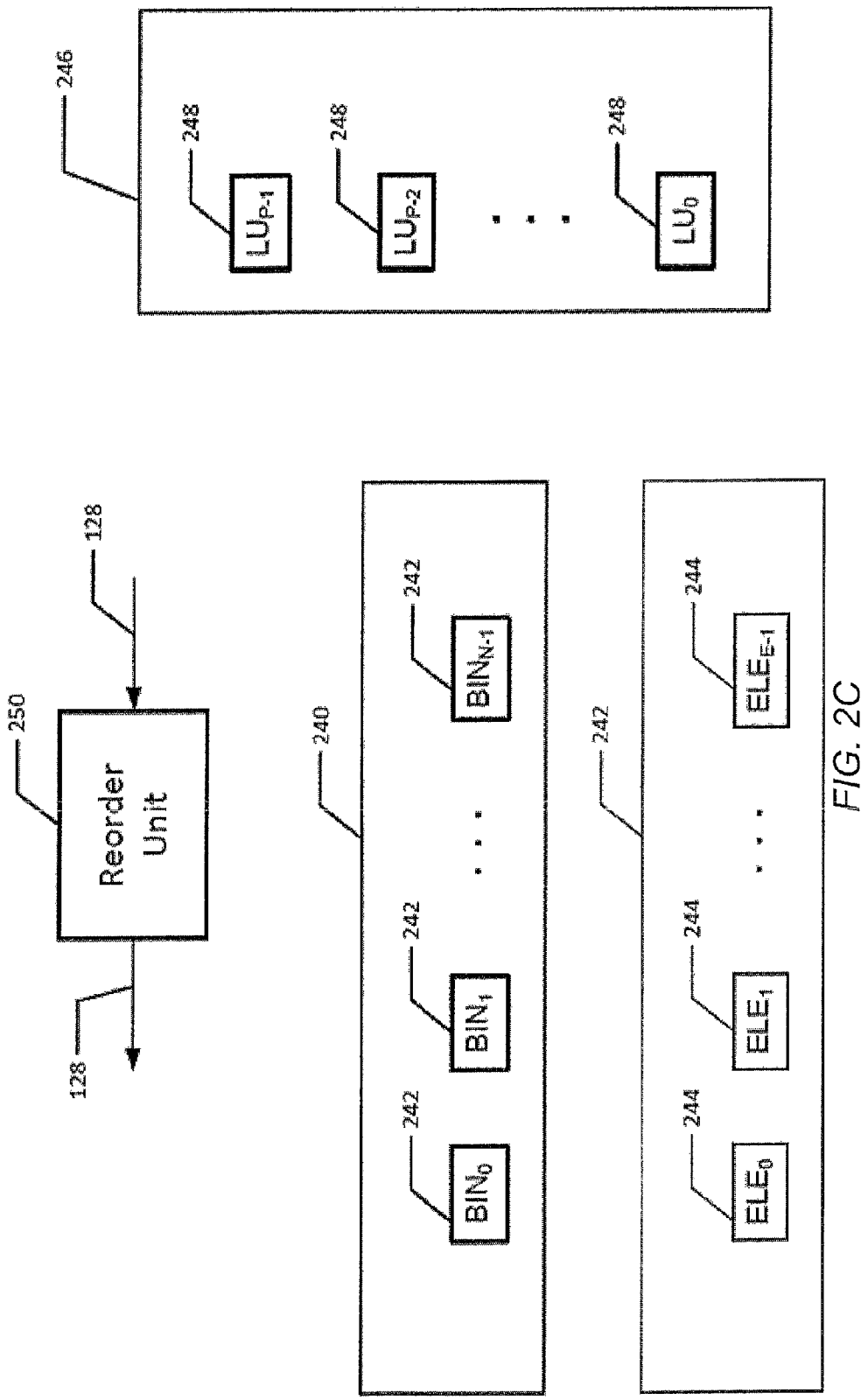
FIG. 2C illustrates an embodiment of a packet reorder device that may be used in a first embodiment of atomic processing.

Referring to FIG. 2C in combination with FIG. 1B, a first embodiment which is operable to enforce atomicity is depicted. The first embodiment to enforce atomicity operates based on reordering of the data to guarantee that a race condition does not occur. The reordering unit 250 is placed on line 128 between the module M and the MCLU 106. A sequence H0, H1, HJ−1 includes J functions each with domain that includes the address space of the SRAMs 152 and range (0,1). A collection 240 (or group) of memory elements in the reorder unit 250 include N memory bins 242 where N=2J. A bin K contains one or more vortex packets. The bin labeled a0, a1, . . . aj contains only vortex packets which have a header containing target vortex register addresses ADD where [H0(ADD), H1(ADD), HN−1 (ADD)]=[a0, a1, . . . aj]. Therefore, no vortex address may appear in two bins. An individual BIN 242 contains E elements 244. The BINs are read and written in a circular fashion. Three integers CA, PIN, and POUT and C control the reading and writing of a given BIN. The counter CA indicates the number of items in BIN, the pointer PIN indicates the next BIN insertion location, and 3) the pointer POUT indicates the next BIN reading location. When an address ADD arrives on line 128 to the reorder unit, the BIN address BA=[H0(ADD), H1(ADD), HN−1(ADD)] is calculated. The reading and writing of BIN(BA) is managed by three integers: 1) a counter CA(BA) that tracks the number of items in BIN(BA); 2) a pointer PIN(BA) that indicates the next insertion location in BIN(BA); and 3) a pointer POUT indicating the next reading location in BIN(BA). The system is designed so that no bin can ever be full. The occurrence of such a condition is considered as an exception. The arriving address is placed in ELEM[PIN(BA)].

Items from the bin collection 240 may be removed by using an irregular stepping scheme designed to reduce the number of items in each bin to a minimum. The scheme is governed by a bin pointer BP and a maximum step parameter SMAX. At a given vortex address removal time, the bins labeled BP, BP+1, . . . BP+SMAX−1 are examined. If all of these bins are empty as indicated by the SMAX values of CA(BA), then no address is read at the current address removal time and BP is reset to BP+SMAX. If one or more of the SMAX bins under examination is not empty, then X may be used to denote the first of the SMAX bins that is not empty. ELEM[POUT(X)] may be read and BP may be reset to X+1. Given that there N bins are used and the maximum step size is SMAX, the same address cannot be read from the bin structure in less than N/(SMAX). The parameters N and SMAX are therefore set so that a race condition cannot occur when addresses from the Reorder Unit 250 are sequentially used.

Figure 2D:
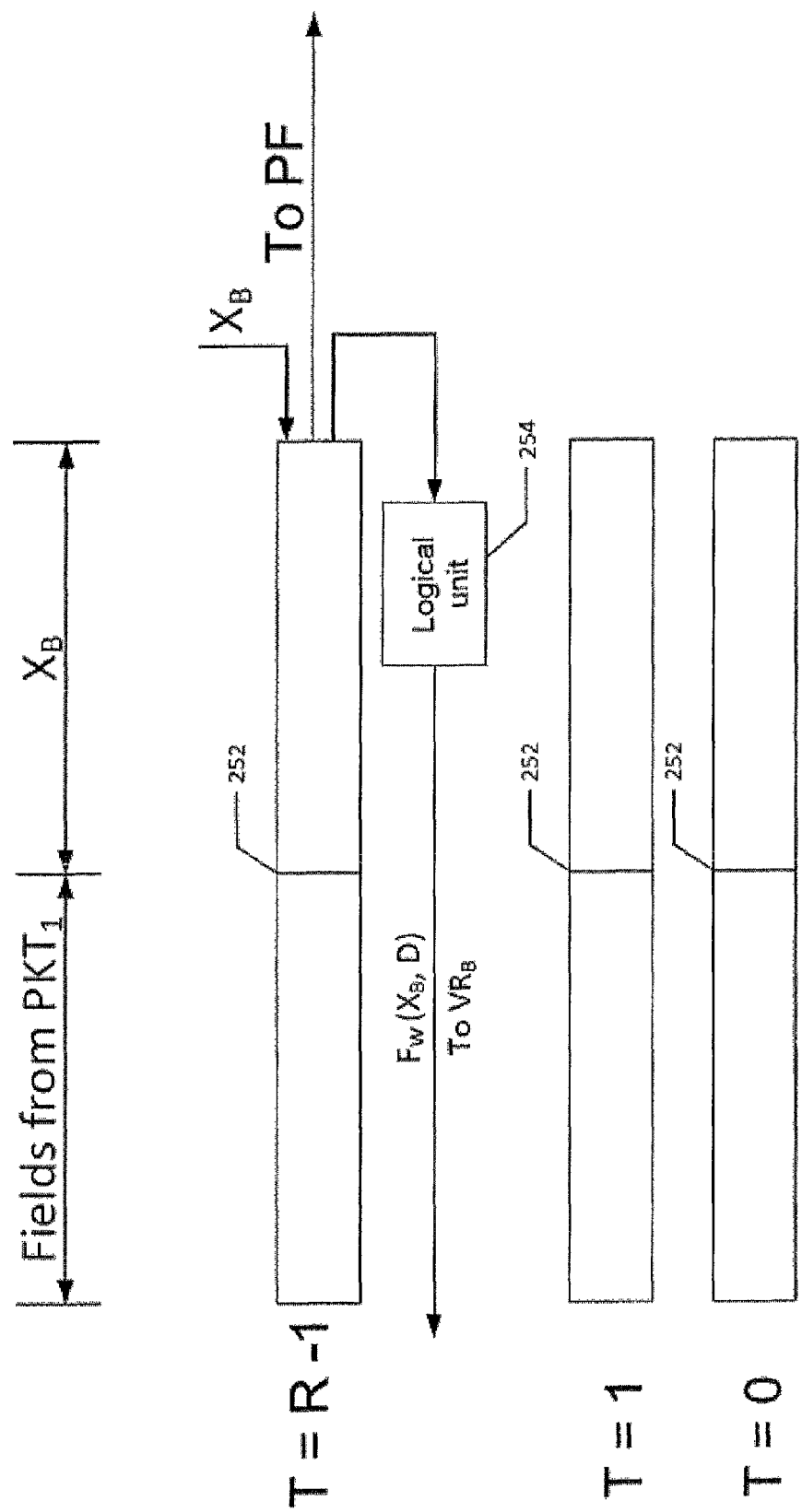
FIG. 2D illustrates an embodiment of a lookup FIFO that may be used in a read-modify-write operation using the first embodiment of atomic operation.

Referring to FIG. 2D, a FIFO of length R in the Reorder Unit 250 is illustrated. The left portion of each element of the FIFO is used for holding vortex addresses. The right side is used for holding the contents of a vortex register. When a vortex address exits the reorder unit, two operations are performed: 1) the packet, or a subset of the fields of the packet to be used, is immediately placed into the left part of the entry level of the R step FIFO; and 2) the memory controller is requested to fetch data XB into the FIFO to arrive R steps later at FIFO level R−1. The contents of the two halves of the top FIFO level are sent to the packet-former PF 108 in manner described in the section entitled "reading remote vortex registers." Also, the packet is forwarded to the logical unit 254 (see FIG. 2D) performs the function prescribed in packet PKT1. The functional unit may have error correction capabilities. The output FW(XB,D) is then written to vortex register VRB. In the event that the logical unit cannot keep up with the timing of the rest of the system, a bank 246 of logical units may be employed and used in a round robin fashion.

Figure 2E:
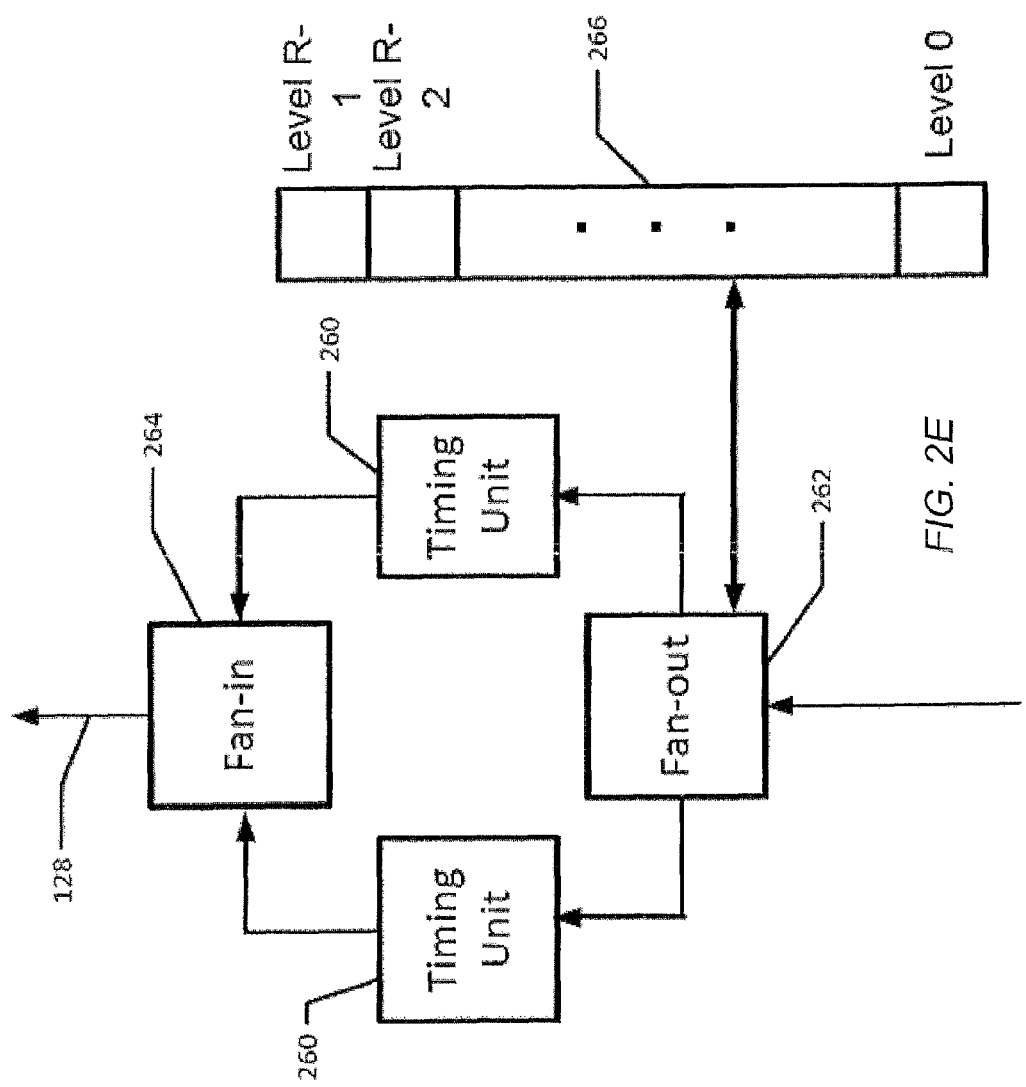
FIG. 2E illustrates an embodiment of timing units and an associated address FIFO.
Figure 2F:
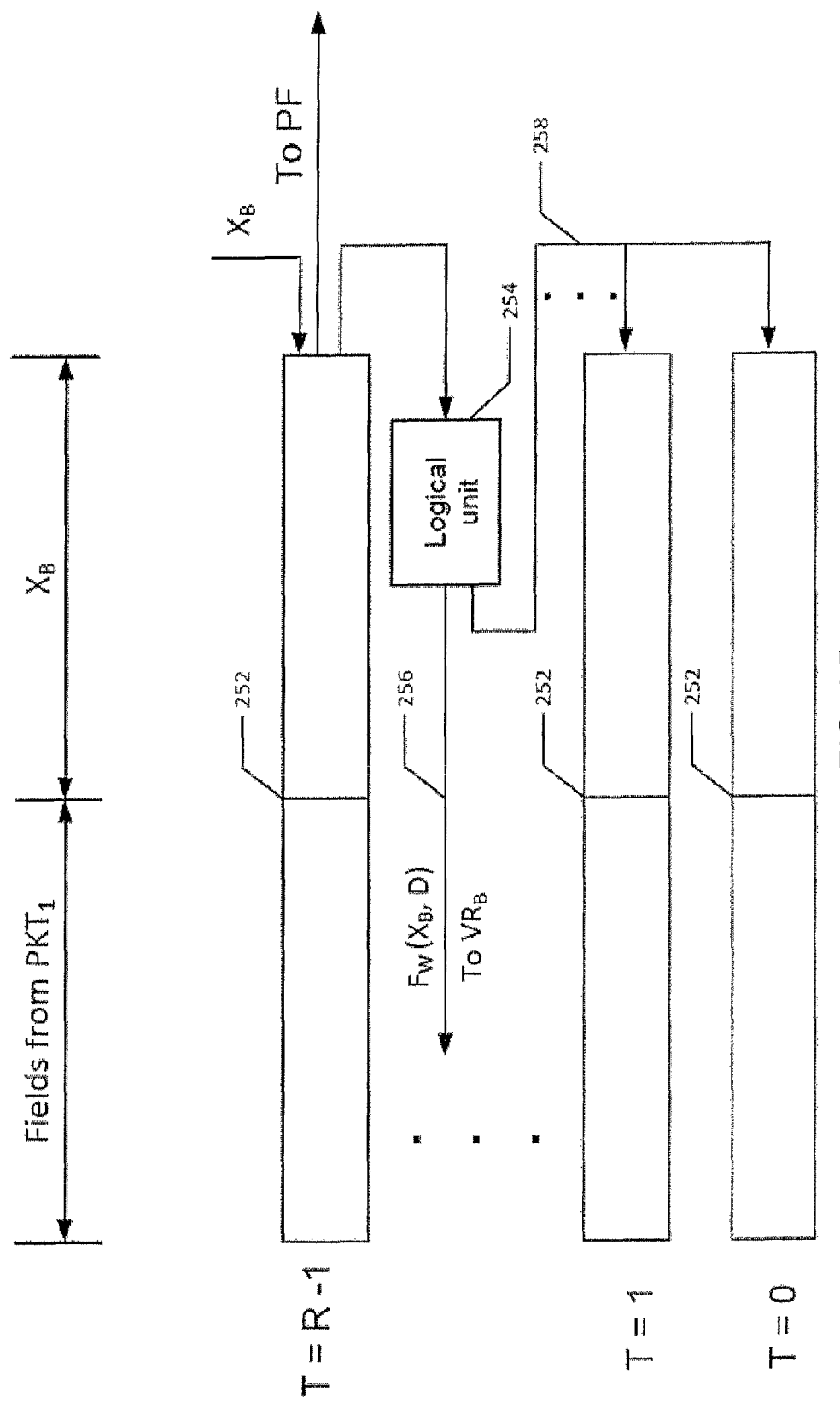
FIG. 2F illustrates an embodiment of a lookup FIFO that may be used in a read-modify-write operation using the second embodiment of atomic operation.

Referring to FIG. 2E and FIG. 2F, a second embodiment to enforce atomicity is depicted and may incorporate an R-length lookup FIFO (shown in FIG. 2F). Prior to inserting a packet PKT into the lookup FIFO, the packet PKT is placed in a timing unit TU 260 that calculates a timing number that is placed in the XB field across from packet PKT in the lookup FIFO. In case an individual timing unit cannot complete actions in a single clock cycle, multiple timing elements may be employed and a fan-out device 262 and fan-in device 264 may be used to allow the timing units to work in a round robin fashion. FIG. 2E illustrates an embodiment in which two timing units are employed. In other embodiments other numbers of timing devices may be used. An additional address FIFO 266 holds the vortex register VRB values associated with the R packets that preceded packet PKT into the address FIFO. The packet PKT enters the timing unit along with the R-long sequence A=A0, A1, . . . AR−1 of vortex register VRB values held in the address FIFO. A0 is the vortex register VRB value of the packet that entered in the time step directly before (one step ahead of) the entrance of packet PKT, A1 is the vortex register VRB value of the packet that entered two steps ahead of the entrance of packet PKT and so forth. If none of the members of the sequence A0, A1, . . . AR−1 is equal to the vortex register VRB value of packet PKT, then the timing unit outputs the value of zero. If As is equal to the vortex register VRB value of packet PKT and S is the smallest integer for which AS is equal to the vortex register VRB value of packet PKT, then the output of the timing unit is R−S. When the sequence A is sent to a timing unit, the address FIFO is shifted and the vortex register VRB value of packet PKT is entered into the entry level of the address FIFO.

The lookup FIFO associated with the second embodiment to guarantee atomicity is illustrated in FIG. 2F. At each time step, the logical unit broadcasts output to all of the other levels of the FIFO. If the value of the XB portion of the level L contains the value of L, then the output of the logical unit is placed in the XB portion of the level L lookup FIFO. If the content of the XB portion of the top level of the FIFO is 0, then the value of XB looked-up in the SRAM is inserted into the XB portion of the top level of the lookup FIFO. The contents of the two halves of the top FIFO level are sent to the packetformer PF 108 in the same manner as described in the section entitled "reading remote vortex registers" Also, the packet is forwarded to the logical unit 254 (see FIG. 2D) performs the function prescribed in packet PKT1. The functional unit may have error correction capabilities. The output, FW(XB,D) is then written to vortex register VRB. In the event that the logical unit cannot keep up with the timing of the rest of the system, a bank 246 of logical units may be employed and used in a round robin fashion.

Examples of remote operations include increment, decrement, compare and swap, floating point add, floating point multiply, AND, integer add, and XOR. Other operations may also be incorporated into the arithmetic logic units associated with each of the SRAM memory banks. These arithmetic logic units proceed as follows: 1) read the contents C of the vortex register VRB; 2) send (or double send to reduce the chance of error) to a vortex register VRA on NICA; 3) perform the arithmetic operation prescribed by the operation code to produce the result D; 4) write D into VRB, and the like. The address of vortex register VRA is a function of the address of vortex register VRB, the address of NICA, and the operation code of the arithmetic operation.

Exemplary Sparse Matrix Column-Based Processing Techniques

As discussed above, and referring again to FIGS. 1A and 1B, in some embodiments, line 122 couples a NIC 100 to one or more processors (e.g., a commodity x86 processor coupled to NIC 100 via a PCIe bus). The processor may include memory controller(s) coupled to local DRAM memory banks Typically, the bus 122 must send fairly large packets (e.g., 2048 bytes of more). These packets are referred to as CPAK packets and may have payloads that include multiple 64-bit words. Further, lines 124 may carry data from NIC 100 to a vortex network and lines 144 may carry data from the network into NIC 100. The vortex network may include multiple independent parallel networks and switch OS 120 may send data randomly to these networks.

As used herein, the term "processing node" refers to a computing element configured to couple to a network that include at least one processor and a network interface. The network may couple a plurality of NICs 100 and corresponding processors, which may be separate computing devices or included on a single integrated circuit, in various embodiments. The network packets that travel between the NICs 100 may be fine grained, e.g., may contain 64-bit payloads in some embodiments. These may be referred to as VPAC packets. In some embodiments, memory banks 152 are SRAM, and each SRAM address indicates a location that contains data corresponding in size to a VPAC payload (e.g., 64 bits). In some embodiments, each CPAK packet in the techniques discussed below contain the same number of words, except for the last packet which may contain fewer words. CPAK packets may be used to transfer data between a network interface and a processor cache or memory and may be large enough to include multiple VPAC payloads.

In some embodiments, the vector X to be multiplied by a matrix A is large and different portions of X are stored in different NIC memory instances 152. FIGS. 3 and 4 illustrate row and column-based matrix-vector multiplication techniques respectively (where columns of matrix A are stored on each processing node in FIG. 3 and rows of matrix A are stored on each processing node in FIG. 4).

FIG. 3, in the illustrated embodiment, shows a matrix A 302 to be multiplied by a vector X 304 to generate a multiplication result Y 308. FIG. 3 shows that a portion 310 of matrix A is stored on a processing node (and remaining portions are distributed across other processing nodes). Portion 310 includes one or more columns of matrix A. Similarly, in the illustrated embodiment, a portion 320 of the X vector is stored on the same processing node, with other portions of X being distributed across other processing nodes. In the illustrated embodiment, the goal of the matrix-vector multiple is to compute result Y 308, a portion of which (e.g., portion 350) will initially be stored on each processing node (the portions may later be aggregated and transmitted, for example). In order to achieve this result, however, the nodes may need to share data with each other.

In illustrated embodiments, matrix A is illustrated as if it was a non-sparse matrix for illustrative purposes, but note that many of the entries in matrix A may be zero and a data structure for A may not contain data for these entries, in various embodiments.

For example, in the illustrated embodiment, the processing node that stores A portion 310 and X portion 320 is configured to compute portion 330 of result Y 308, using its stored data. To generate its full result portion 350, however, this processing node may need processing results from other nodes (shown as portion 340 of Y in the illustrated embodiment).

In some embodiments, A is so large that it needs over half of system memory across all available processing nodes for storage. In some embodiments, X is so long that it cannot be stored in a single memory module 152. In some embodiments, X is therefore distributed across multiple processing nodes' memory modules 152 or DRAM and A is stored in DRAM on a processing node. The different processing nodes may be coupled via network 164, as shown in FIG. 1B.

In some embodiments, the following information is initially stored for column-based techniques: (1) the A matrix portions and X vector portions are stored in DRAM of different processing nodes and (2) the addresses in DRAM for storing summed multiplication results (Y-vector addresses) for each processing node are stored in its SRAM memory module 152. In some embodiments, the X vector is stored such that the Nth entry in the X vector is on the same processing node as the Nth column of the A matrix.

In some embodiments, each processing node performs multiplication of entries in its A matrix portion (e.g., portion 310) and entries in its X vector portion (e.g., portion 320) to generate multiplication results for a portion (e.g., portion 330) of the Y output 308. This data may be stored in DRAM. In some embodiments, these partial multiplication results then need to be summed to generate Y values, but reside on different processing nodes.

In the illustrated embodiment, to generate the result portion 350 to be stored in the first processing node, the other nodes are configured to send VPAK packets that include: a multiplication result (which may include a single multiplication result (e.g., $A_{ij}X_k$) or the sum of multiple multiplications on the same processing node), an opcode (e.g., indicating an addition operation), and an address in a memory module 152 (where the address stores an address for storing partial multiplication results corresponding to portion 330). As discussed above, in some embodiments, the addresses in memory module 152 are pre-loaded with addresses corresponding to multiplication results generated by a particular processing node (e.g., one or more of the multiplication results in portion 330). In some embodiments, in response to receiving such a VPAK packet, the receiving processing node is configured to atomically add the value in the packet to the value in the DRAM address pointed to by data stored in the NIC register in memory module 152 indicated by the packet, and store the addition result in the same location (corresponding to the DRAM address). Once all of the VPAK packets are thus processed, each processing node contains its portion 350 of the output vector Y, based on the atomic additions of the various multiplication results.

Thus, in some embodiments, the computer contains a number of servers with each server containing local DRAM memory. The matrix A is distributed across these memories. A column C of A containing W non-zero entries is stored in a W+1 long sequence of pairs of numbers: $(U_0, V_0)$, $(U_1, V_1)$, $(U_2, V_2)$, . . . , $(U_w, V_w)$. $U_0=C$; $V_0=W$; for $1<N<W$, UN is the row number that contains the $N^{th}$ non-zero entry in column C and VN is the A matrix value at row UN and column C. The X-vector is stored so that Xc is stored in the node that contains column C in its local DRAM. The addresses for the Y-vector are stored across the SRAM modules 152 so that an equal number of Y-vector address on each module except the last SRAM module that may contain fewer Y-vector addresses. In a given SRAM module the Y-vector addresses are stored sequentially. These Y-vector addresses are initially all set of 0. For each $(U_K, V_K)$ pair on column C, the processor sends the product $P=[(X_C)(V_K)]$ to the SRAM address $U_K$ corresponding to an entry in the Y vector. This is accomplished by sending a packet with payload P, and header containing the address $U_K$ and an OP code indicating the incoming payload is to be added to the contents of $U_K$ and stored in $U_K$. In the program, CPAK packets are sent from a processor and its VIC, and VPAK packets are sent from NIC to NIC. The Y-vector answer is now spread across several SRAM modules.

In various embodiments, these techniques may reduce processing times for matrix-vector multiplication, e.g., by reducing network congestion by sending fine-grained packets with necessary information between the various processing nodes.

In some embodiments, network 164 is a self-routing network (such that a node sending a packet does not need to worry about what other nodes are sending, although a NIC may refuse data based on spatial conditions, in some situations) and is configured to transmit short packets. In some embodiments, network 164 is congestion-free when properly used. Network 164 may use high-radix switches, unlike conventional torus networks and small packets, unlike Infiniband networks, for example.

Exemplary Sparse Matrix Row-Based Processing Techniques

FIG. 4, in the illustrated embodiment, shows a matrix A 402 to be multiplied by a vector X 404 to generate a multiplication result Y 408. FIG. 4, in the illustrated embodiment, shows that a portion 410 of matrix A is stored on a processing node (and remaining portions are distributed across other processing nodes). Portion 410 includes one or more rows of matrix A. Similarly, in the illustrated embodiment, a portion 320 of the X vector is stored on the same processing node, with other portions of X being distributed across other processing nodes. In the illustrated embodiment, the goal is to compute result Y 308, a portion of which (e.g., portion 350) will be stored on each processing node. In order to achieve this result, however, the nodes may need to share data with each other.

For example, in the illustrated embodiment, the processing node that stores A portion 410 and X portion 420 is configured to compute portion 430 of result Y 408, using its stored data. To generate its full result portion 450, however, this processing node may need vector values from other nodes (one or more values in portion 440 of X in the illustrated embodiment).

In some embodiments, the following information is initially stored for row-based techniques: (1) portions of the A matrix are stored in DRAM of different processing nodes, (2) portions of the X vector are stored in SRAM memory modules 152 of different processing nodes, and (3) addresses of remote portions of the X vector are stored across the SRAM modules 152. Thus, portions of each SRAM memory module 152 are allocated for storing remote X-vector addresses and received X-vector values used during processing. For example, as shown in FIG. 5, a portion 530 of the X-vector is stored along with two buffers 510 and 520 for X-vector address corresponding to A-Matrix indices and two buffers 512 and 522 for received X-vector values from remote processing nodes. In some embodiments, other numbers of buffers may be used, e.g., a single buffer 510 and 512, or more than two buffers. Using more than one buffer may allow data transmission times to be hidden during processing times for data retrieved in another buffer, in some embodiments. Additional portions of each SRAM (not shown explicitly in FIG. 5) may be unused.

In some embodiments, portions of the A matrix are stored using a data structure that indicates, for each row: (1) the row number, (2) the number of non-zero A matrix entries in the row, and (3) for each non-zero entry, the column and value of the entry. (Similar storage techniques may be used for the column-based techniques discussed above, with rows and columns swapped, in some embodiments). In other embodiments, any of various appropriate data structures for storing matrices or sparse matrices may be used to store A.

In some embodiments, the process begins by transferring a CPAK packet of addresses corresponding to non-zero A-matrix indices to SRAM area 510. A counter for this group may be set based on the number of addresses. Then, packet former 108 may gather corresponding X-vector entries from remote processing nodes in the system. To do so, packet former 108 may produce requests packets that are sent to the remote NIC memory addresses that contain the proper X-vector values. In some embodiments, packet former 108 operates sequentially on each address in the 510 area. When operating on the Nth address in the sequence, in some embodiments, the packets may contain an address the desired X-vector entry, the value of N, and a group counter address. The return packets may include an operation code to indicate that the payload of the return packets are to be written to the Nth entry in the sequence 512 of received X-vector values. The group counter may be decremented when each return packet is received, based on the group counter address. Areas 510/512 and 520/522 may be used to hide data transfer latency, e.g., by processing received X-vector values 512 while received X-vector values 522 are being aggregated, after which received X-vector values 522 may be ready for processing.

Once the group counter has reached zero, in some embodiments, the receiving processing NIC may transfer the X-vector members using a CPAK packet. The receiving processing node may then perform multiplication of the X-vector values by the corresponding A-matrix entries, to generate a portion of the result vector Y (e.g., portion 450).

Thus, in some embodiments, the computer contains a number of servers with each server containing local DRAM memory. The matrix A is distributed across these memories. A row R of A containing W non-zero entries is stored in a W+1 long sequence of pairs of numbers: $(U_0, V_0)$, $(U_1, V_1)$, $(U_2, V_2)$, ..., $(U_w, V_w)$. $U_0=R$; $V_0=W$; for $1<N<W$, UN is the column number that contains the $N^{th}$ non-zero entry in row R and VN is the A matrix value at column UN and row R. The Y-vector addresses are stored so that $Y_R$ is stored in the node that contains row R in its local DRAM. The $Y_R$ values are initially set to zero. The addresses for the X-vector are stored across the SRAM modules 152 so that an equal number of X-vector address on each module except the last SRAM module that may contain fewer X-vector addresses. In a given SRAM module the X-vector addresses are stored sequentially. For each $(U_K, V_K)$ pair on row R, the processor sends the proper information to the NIC for the NIC packet former create a packet PKT whose header contains the NIC address of Xs, where $S=U_K$. The payload of PKT contains an address ADD on the sending NIC. The header also contains an OP code indicating that the arrival of the packet at the target NIC causes that NIC to form a packet whose payload contains Xs and whose header specifies an ADD operation. When the appropriate group counter indicates that all of the request packets have received response packets then the packets are transferred to the processor's DRAM memory into locations that line up with the proper A matrix members.

Now all of the proper data is in place for the processor to form the proper multiplications and additions to form the $R^{th}$ Y-vector value.

In various embodiments, these techniques may reduce processing times for matrix-vector multiplication, e.g., by reducing network congestion by sending fine-grained packets with necessary information between the various processing nodes.

Although matrix-vector multiplication has been discussed herein for exemplary purposes, similar data transfer techniques apply to various other operations on large input data sets. Further, although the disclosed system utilized coupled NIC 100 and processing node computing devices, in some embodiments similar processing elements are included on a single integrated circuit. In various embodiments, the disclosed techniques may be implemented using any of various appropriate processing elements, including FPGAs, networked commodity processors, custom ASICs, etc. In various embodiments, the ability to send fine-grained packets (with a payload that is significantly smaller than the size of a cache line of a relevant processor) may significantly reduce processing time and/or power consumption.

Exemplary Methods

Figure 6:
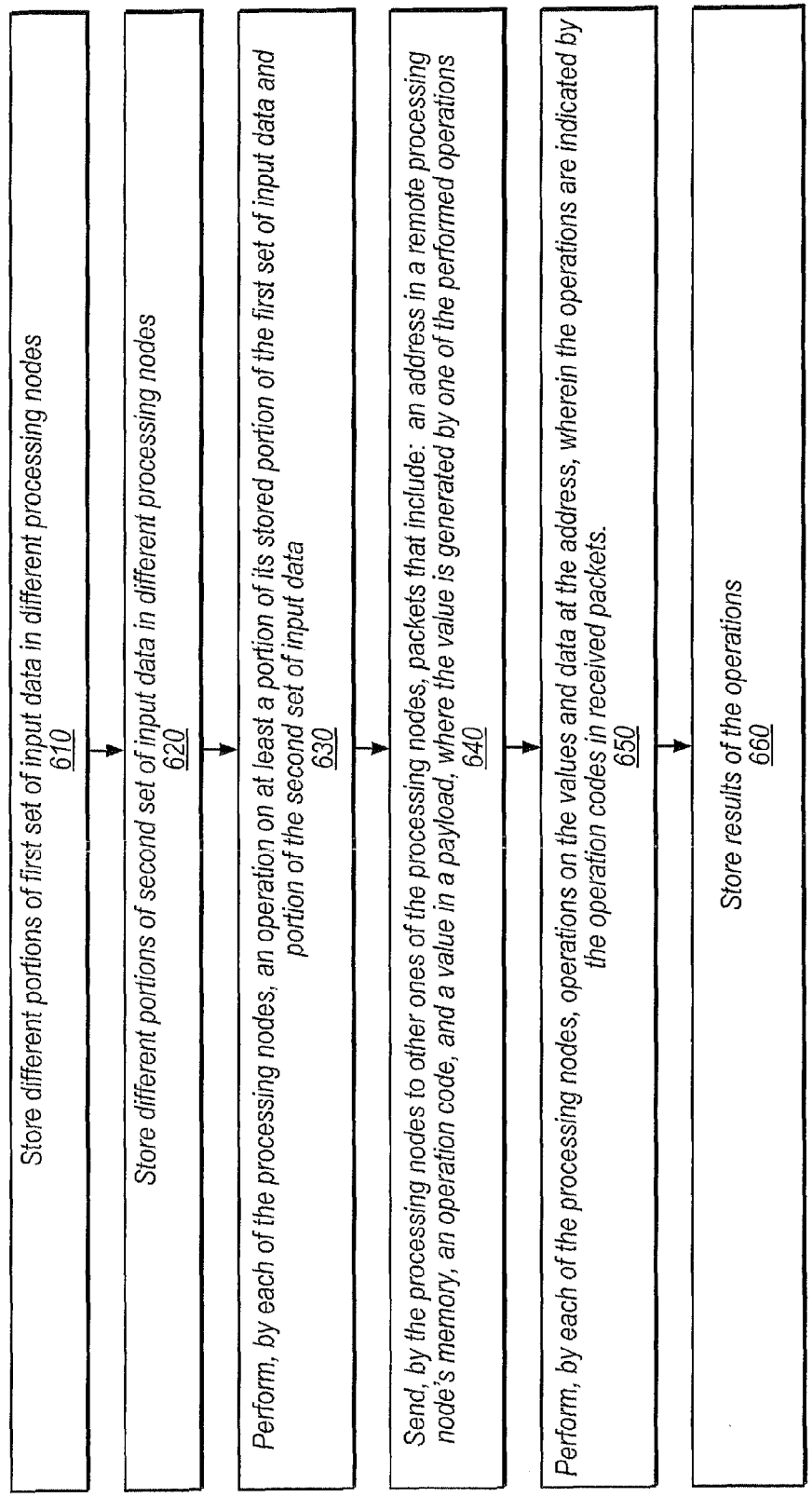
FIG. 6 is a flow diagram illustrating a method for fine-grained parallel data processing (e.g., usable for column-based matrix-vector multiplication), according to some embodiments.

FIG. 6 is a flow diagram illustrating a method for parallel data processing, according to some embodiments. The method of FIG. 6 may be used to perform the column-based matrix vector multiplication of FIG. 3, in some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 610.

At 610, in the illustrated embodiment, different portions of a first set of input data are stored in different processing nodes. The different portions of the data may be partially overlapping or may be completely distinct, with no overlapping elements. In some embodiments, the first set of input data is a sparse matrix, e.g., matrix A. In some embodiments, the processing nodes are configured to communicatively couple to a network.

At 620, in the illustrated embodiment, different portions of a second set of input data are stored in the different processing nodes. In some embodiments, the second set of input data is a vector (e.g., vector X). In some embodiments, the first and second sets of input data are both stored in DRAM. In other embodiments, the second set of input data may be stored in an SRAM, e.g., in registers associated with a network interface of each processing node.

At 630, in the illustrated embodiment, each processing node performs an operation on at least a portion of its stored portion of the first set of input data and portion of the second set of input data. For example, this may include generating a portion of the products to be summed for a row of an output vector Y for matrix-vector multiplication.

At 640, in the illustrated embodiment, the processing nodes send packet to remote processing nodes that include: an address in a remote processing node's memory, an operation code, and a value in a payload. In the illustrated embodiment, the value in the payload is generated by one of the performed operations in 630. For example, the payload of one packet may include a value such as $A_{1,n}X_n$ of FIG. 3 (or the summation of multiple products generated by the same processing node) and the packet may be send to the processing node configured to produce portion 350 of the Y vector 380. The packets may be fine-grained VPAK packets that are scattered across a vortex network. For example, each packet may include only a single value. As another example, each packet may have a data payload that is smaller than a minimum cache line (e.g., an L1 cache line size in some embodiments) of the processing nodes.

At 650, in the illustrated embodiment, each processing node performs operations on the values of received packets and data at the specified address of the received packets (e.g., by adding products for a row of Y 308 generated by a receiving processing node with products generated by other processing nodes). In the illustrated embodiment, the operations (e.g., an add operation) are indicated by the operation codes in the received packets. In some embodiments, the operations are performed atomically, using the techniques discussed above. This may ensure that each entry in Y is correctly incremented by resolving any conflicts between multiple additions to the same entry.

At 660, the results of the operations are stored. In some embodiments, this is performed by storing the results at the address indicated by the received packets, e.g., modifying the Y vector 308 in-place in the embodiment of FIG. 3. After all operations have been performed and their results stored, each processing node may hold a portion of a result of the operation, e.g., a portion of the Y vector in the embodiment of FIG. 3.

Figure 7:
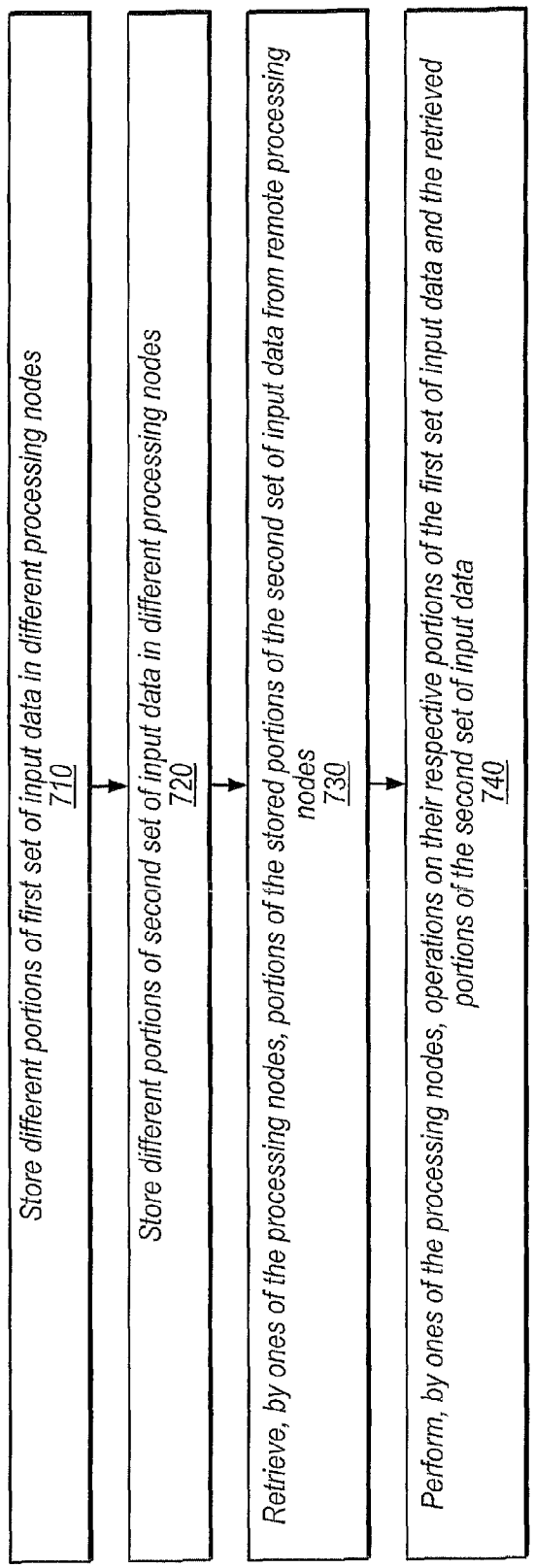
FIG. 7 is a flow diagram illustrating another method for fine-grained parallel data processing (e.g., usable for row-based matrix-vector multiplication), according to some embodiments.

FIG. 7 is a flow diagram illustrating a method for parallel data processing, according to some embodiments. The method of FIG. 7 may be used to perform the row-based matrix vector multiplication of FIG. 4, in some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 710.

At 710, in the illustrated embodiment, different portions of a first set of input data are stored in different processing nodes. In some embodiments, the first set of input data is a sparse matrix, e.g., matrix A. In some embodiments, the processing nodes are configured to communicatively couple to a network.

At 720, in the illustrated embodiment, different portions of a second set of input data are stored in the different processing nodes. In some embodiments, the second set of input data is a vector (e.g., vector X). In some embodiments, the first and second sets of input data are both stored in DRAM. In other embodiments, the second set of input data may be stored in an SRAM, e.g., in registers associated with a network interface of each processing node.

At 730, in the illustrated embodiment, the processing nodes retrieve portions of the stored portions of the second set of input data from remote processing nodes. For example, in the embodiment of FIG. 4, the processing nodes may retrieve portions of portion 440 needed to generate their respective portion of Y vector 408 (e.g., portion 450). In some embodiments, the retrieving includes sending a request VPAK packet that includes an index in a completion group and receiving a response VPAK packet that includes the retrieved data and the index. Once a completion group has been filled, a CPAK packet may be used to transfer the data to a processing node's DRAM for further processing, in some embodiments.

At 740, in the illustrated embodiment, the processing nodes perform operations on their respective portions of the first set of input data and the retrieved portions of the second set of input data. In some embodiment's, the processing nodes also perform similar operations on their respective portions of the first set of input data and their respective portions of the second set of input data. At this point, e.g., in the example of FIG. 4, each processing node may hold a portion of a result of the particular operation to be performed (e.g., a matrix-vector multiply).

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for performing a particular operation using first and second sets of input data, using a system comprising a plurality of processing nodes, wherein each of the plurality of processing nodes includes a respective local memory and a respective local network interface (NI), wherein the plurality of processing nodes are configured to communicatively couple to a network via the NIs, the method comprising:
   storing different portions of the first set of input data in different ones of the processing nodes;
   storing different portions of the second set of input data in different ones of the processing nodes;
   first performing, by each of the processing nodes, an operation on at least a portion of its stored portion of the first set of input data and portion of the second set of input data;
   sending, by the processing nodes to other ones of the processing nodes, packets that include: an address in a remote processing node's memory that contains an input on which an operation is to be performed, an operation code, and a value in a payload, wherein the value is generated by an operation of the first performing;
   second performing, by the processing nodes, operations indicated by the operation code in received packets, wherein the operations are performed on the value in the payload and on data stored at the address corresponding to the received packets; and
   storing results of the second performing using the address indicated by the received packets.

2. The method of claim 1, wherein the second performing is performed atomically for each received packet.

3. The method of claim 1, wherein the operation code indicates at least one of: a multiplication, an addition, or a subtraction.

4. The method of claim 1,
   wherein the particular operation is a matrix-vector multiply;
   wherein the different portions of the first set of input data are non-zero entries for columns of a sparse matrix;
   wherein the different portions of the second set of input data are portions of a vector to be multiplied by the sparse matrix;
   wherein the first performing includes multiplying entries in the sparse matrix by entries in the vector;
   wherein the second performing includes adding results of the multiplying performed by another processing node with results of the multiplying performed by the receiving processing node; and wherein, subsequent to the second performing, each processing node stores a portion of an output vector corresponding to multiplication of the sparse matrix by the vector.

5. The method of claim 1, wherein the first set of input data is larger than half of a system memory space available across the plurality of processing nodes.

6. The method of claim 1, wherein the packets have a data payload that is smaller than a minimum cache line size of the processing nodes.

7. The method of claim 1, wherein the packets each include only a single value generated by a performed operation.

8. A method for performing a particular operation using first and second sets of input data, using a system comprising a plurality of processing nodes, wherein each of the plurality of processing nodes includes a respective local memory and a respective local network interface (NI), wherein the plurality of processing nodes are configured to communicatively couple to a network via the NIs, the method comprising:
   storing different portions of the first set of input data in different ones of the processing nodes;
   storing different portions of the second set of input data in different ones of the processing nodes;
   retrieving, by ones of the processing nodes, portions of the stored portions of the second set of input data from remote processing nodes, wherein the retrieving includes sending a request packet that provides an index in a completion group and receiving a response packet that includes the index for storing a response payload; and
   performing, by ones of the processing nodes, operations on their respective portions of the first set of input data and the retrieved portions of the second set of input data;
   wherein, after the performing, the processing nodes store different portions of a result of the particular operation.

9. The method of claim 8,
   wherein the particular operations is a matrix-vector multiply;
   wherein the different portions of the first set of input data are non-zero entries for rows of a sparse matrix;
   wherein the different portions of the second set of input data are portions of a vector to be multiplied by the sparse matrix;
   wherein the performing includes multiplying entries in the sparse matrix by entries in the vector; and
   wherein, subsequent to the performing, each processing node stores a portion of an output vector corresponding to multiplication of the sparse matrix by the vector.

10. The method of claim 8, wherein the second set of input data is larger than a size of data that a given one of the processing nodes is configured to store.

11. The method of claim 8, wherein the portions of the second set of input data are stored in SRAM in network interface portions of the processing nodes.

12. The method of claim 8, wherein packets used for the retrieving have a data payload that is smaller than a minimum cache line size of the processing nodes.

13. The method of claim 8, wherein packets used for the retrieving each include only a single value of the second set of input data.

14. The method of claim 8, wherein the retrieving includes assigning request packets to a completion group and transferring data for the completion group once all response packets for the completion group have been aggregated.

15. A non-transitory computer-readable medium having, instructions stored thereon that are executable by a computing system that comprises a plurality of processing nodes, wherein each of the plurality of processing nodes includes a respective local memory and a respective local network interface (NI), wherein the plurality of processing nodes are configured to communicatively couple to a network via the NIs, wherein the instructions are executable to cause the computing system to perform operations comprising:
   storing different portions of a first set of input data in different ones of the processing nodes;
   storing different, portions of a second set of input data in different ones of the processing nodes;
   first performing, by each of the processing nodes, an operation on at least a portion of its stored portion of the first set of input data and second set of input data;
   sending, by the processing nodes to other ones of the processing nodes, packets that include: an address in a remote processing node's memory that contains an input on which an operation is to be performed, an operation code, and a value in a payload, wherein the value is generated by the performed operation;
   second performing, by the processing nodes, operations indicated by the operation code in received packets, wherein the operations are performed on the value in the payload and on data stored at the address corresponding to the received packets; and
   storing a result of the operations using the address indicated by the received packets.

16. The non-transitory computer-readable medium of claim 15, wherein the second performing is performed atomically for each received packet.

17. The non-transitory computer-readable medium of claim 15,
   wherein an operation being performed is a matrix-vector multiply;
   wherein the different portions of the first set of input data are non-zero entries for columns of a sparse matrix;
   wherein the different portions of the second set of input data are portions of a vector to be multiplied by the sparse matrix;
   wherein the first performing includes multiplying entries in the sparse matrix by entries in the vector;
   wherein the second performing includes adding results of the multiplying performed by another processing node with results of the multiplying performed by the receiving processing node; and
   wherein, subsequent to the second performing, each processing node stores a portion of an output vector corresponding to multiplication of the sparse matrix by the vector.

18. The non-transitory computer-readable medium of claim 15, wherein the packets have a data payload that is smaller than a minimum cache line size of the processing nodes.

19. The non-transitory computer-readable medium of claim 15, wherein the packets each include only a single value generated by a performed operation.

* * * * *

UNITED STATES PATENT AND TRADEMARK OFFICE
CERTIFICATE OF CORRECTION

PATENT NO. : 9,930,117 B2
APPLICATION NO. : 14/871431
DATED : March 27, 2018
INVENTOR(S) : Coke S. Reed et al.

Page 1 of 1

It is certified that error appears in the above-identified patent and that said Letters Patent is hereby corrected as shown below:

In the Claims

Claim 15, Column 26, Line 17, please delete "different, portions" and substitute -- different portions --.

Signed and Sealed this
Eighth Day of May, 2018

Andrei Iancu
*Director of the United States Patent and Trademark Office*